(12) United States Patent
Yan et al.

(10) Patent No.: US 12,510,937 B2
(45) Date of Patent: Dec. 30, 2025

(54) DISPLAY ASSEMBLY AND FOLDABLE ELECTRONIC DEVICE

(71) Applicant: HONOR DEVICE CO., LTD., Shenzhen (CN)

(72) Inventors: Bin Yan, Shenzhen (CN); Kun Liu, Shenzhen (CN); Zhize Wang, Shenzhen (CN); Yihe Zhang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 4 days.

(21) Appl. No.: 18/549,396

(22) PCT Filed: Aug. 30, 2022

(86) PCT No.: PCT/CN2022/115794
§ 371 (c)(1),
(2) Date: Sep. 7, 2023

(87) PCT Pub. No.: WO2023/040652
PCT Pub. Date: Mar. 23, 2023

(65) Prior Publication Data
US 2024/0219977 A1    Jul. 4, 2024

(30) Foreign Application Priority Data
Sep. 18, 2021 (CN) .......................... 202111097307.4

(51) Int. Cl.
*G06F 1/16*    (2006.01)

(52) U.S. Cl.
CPC .......... *G06F 1/1681* (2013.01); *G06F 1/1652* (2013.01)

(58) Field of Classification Search
CPC .... G06F 1/1652; G06F 1/1681; G06F 1/1616; G06F 1/1641
See application file for complete search history.

(56) References Cited

U.S. PATENT DOCUMENTS

| | | |
|---|---|---|
| 9,348,362 B2 | 5/2016 | Ko et al. |
| 9,983,424 B2 | 5/2018 | Kim et al. |
| 11,523,523 B2 | 12/2022 | Han |
| 11,546,986 B2 | 1/2023 | Wang et al. |
| 11,568,767 B2 | 1/2023 | Feng |

(Continued)

FOREIGN PATENT DOCUMENTS

| | | |
|---|---|---|
| CN | 103985315 A | 8/2014 |
| CN | 106252378 A | 12/2016 |

(Continued)

*Primary Examiner* — Abhishek M Rathod
(74) *Attorney, Agent, or Firm* — Fish & Richardson P.C.

(57) ABSTRACT

This application relates to a display assembly and a foldable electronic device. The display assembly includes: a flexible screen; and a protective component connected to the flexible screen in a first direction, where a bending region of the protective component includes a first region and second regions located on two sides of the first region in a second direction; and when the display assembly is bent, the first region has a smaller average deformation amount than each second region in the second direction. When the display assembly is in a folded state, the bending region of the protective component forms a screen accommodating space for accommodating a folded portion of the flexible screen.

20 Claims, 14 Drawing Sheets

(56) References Cited

U.S. PATENT DOCUMENTS

| | | | |
|---|---|---|---|
| 2018/0032107 A1 | 2/2018 | Cho et al. | |
| 2019/0132947 A1* | 5/2019 | Koo | H05K 1/0281 |
| 2021/0111357 A1 | 4/2021 | Tsuyoshi et al. | |
| 2021/0263563 A1 | 8/2021 | Tsuchihashi et al. | |
| 2021/0352814 A1* | 11/2021 | Park | B32B 3/266 |
| 2022/0093012 A1* | 3/2022 | Lee | G06F 1/1616 |
| 2022/0099882 A1* | 3/2022 | Wen | G02B 6/0055 |
| 2022/0396050 A1* | 12/2022 | Zhu | B32B 3/30 |
| 2023/0018777 A1* | 1/2023 | Park | G06F 1/1656 |
| 2023/0035622 A1* | 2/2023 | Kang | G06F 1/1652 |
| 2023/0154360 A1* | 5/2023 | Zhao | B32B 3/266 |
| 2023/0354533 A1* | 11/2023 | Fu | H04M 1/0268 |

FOREIGN PATENT DOCUMENTS

| | | | | |
|---|---|---|---|---|
| CN | 109830185 A | | 5/2019 | |
| CN | 110164309 A | * | 8/2019 | ............ G09F 9/301 |
| CN | 110853510 A | | 2/2020 | |
| CN | 110853520 A | | 2/2020 | |
| CN | 110992838 A | | 4/2020 | |
| CN | 210578705 U | | 5/2020 | |
| CN | 111415586 A | | 7/2020 | |
| CN | 111477107 A | | 7/2020 | |
| CN | 210955911 U | | 7/2020 | |
| CN | 213846735 U | | 7/2021 | |
| CN | 113380145 A | * | 9/2021 | ............ G09F 9/301 |
| WO | 2021129407 A1 | | 7/2021 | |

\* cited by examiner

DISPLAY ASSEMBLY AND FOLDABLE ELECTRONIC DEVICE

CROSS-REFERENCE TO RELATED APPLICATIONS

This application is a national stage of International Application No. PCT/CN2022/115794, filed on Aug. 30, 2022, which claims priority to Chinese Patent Application No. 202111097307.4, filed on Sep. 18, 2021. The disclosures of the aforementioned applications are hereby incorporated by reference in their entireties.

TECHNICAL FIELD

This application relates to the technical field of electronic devices, and in particular, to a display assembly and a foldable electronic device.

BACKGROUND

A foldable electronic device includes a housing, a folding apparatus, and a flexible screen. The housing includes a left housing and a right housing arranged separately, the folding assembly is located between the left housing and the right housing, and the flexible screen is mounted to the left housing and the right housing. When the left housing and the right housing are folded under the driving of the folding apparatus, a bending region of the flexible screen can be folded so that the electronic device is in a folded state. In the folded state, the electronic device has a small volume, which is convenient for storage; and when the left housing and the right housing are unfolded under the driving of the folding apparatus, the bending region of the flexible screen is driven to unfold so that the electronic device is in an expanded state. In the expanded state, a display screen of the electronic device is large, which can improve user experience. In the foldable electronic device, reliability and service life of the flexible screen affect performance and service life of an entire electronic device.

Generally, a protective component is arranged on the back of the flexible screen, and the flexible screen is protected by the protective component. When the electronic device is folded, the bending region of the protective component is bent to form a screen accommodating space for accommodating the flexible screen. When the bending rigidity of the bending region of the protective component is excessively large, a deformation amount during the bending process of the protective component is excessively small, and a radius of the screen accommodating space after bending is excessively small, which cannot provide enough screen accommodating space for the flexible screen. The flexible screen is pulled or squeezed at a folded position, which causes undesirable phenomena such as creasing or even fracturing of the flexible screen.

SUMMARY

This application provides a display assembly and a foldable electronic device. The display assembly can reduce a risk of layer separation and fracturing of a screen of a bending region.

A first aspect of this application provides a display assembly, applied to a foldable electronic device, where the display assembly includes: a flexible screen; and a protective component, connected to the flexible screen in a first direction of the protective component, where a bending region of the protective component includes a first region and second regions located on two sides of the first region in a second direction; and when the display assembly is bent, the first region has a smaller average deformation amount than each second region in the second direction. The first region has a smaller deformation amount than each second region under the same external force, so as to reduce the risk that the formed screen accommodating space has an excessively small radius due to an excessive deformation amount during the folding process of the first region, and increase the bending radius after the deformation of the bending region, and further reduce the squeezing of the protective component on the flexible screen to reduce the risk of layer separation and fracturing of the flexible screen, thereby improving service life and reliability of the display assembly.

In a possible design, when the display assembly is bent, a bending rigidity of the first region is greater than a bending rigidity of the second region. The bending rigidity of the protective component is specifically the bending rigidity in the second direction, and the bending rigidity is proportional to the radius of the protective component after bending. Moreover, the deformation amount of the protective component during bending has an opposite change relationship with the bending rigidity. That is to say, under the action of the same bending moment, a larger deformation amount leads to a smaller bending rigidity for the same material. Since the first region of the bending region of the protective component has the largest deformation amount when the display assembly is in the folded state, the bending rigidity of the first region is greater than the bending rigidity of the second region in the second direction X, and the deformation amount of the first region is less than the deformation amount of the second region under an action of the same external force, thereby reducing a risk that the radius of the screen accommodating space formed by the deformation amount of the first region is excessively large during the folding process, and increasing the bending radius after the deformation of the bending region. Further, under the squeezing action of the protective component on the flexible screen, the risk of layer separation and fracturing of the flexible screen is reduced, and service life and reliability of the display assembly are improved.

In a possible design, a plurality of recessed portions recessed in the first direction are arranged in the bending region, and the plurality of recessed portions are spaced apart from each other in the second direction and a third direction. The arrangement of the recessed portion reduces a cross-sectional area of the protective component to withstand stress during the bending process, thereby reducing the bending rigidity of the bending region, so that the bending region of the protective component can be greatly deformed during the folding process, the screen accommodating space for accommodating the folded portion of the flexible screen is formed, and the folding of the electronic device is realized. Each recessed portion can reduce the squeezing of the folded portion of the flexible screen by the protective component, and reduce the risk of layer separation and fracturing of the flexible screen.

In a possible design, in a plane where the third direction and the second direction are located, an area of the first region is S1, and a total area of the recessed portion located in the first region is S2, where $1/4 \leq S2/S1 \leq 2/3$. If S2/S1 is excessively small, the area of the recessed portion arranged in the first region is excessively small, which causes the bending rigidity of the first region is large. When the display assembly is folded, the deformation amount of the first region after bending is small, the protective component cannot provide sufficient screen accommodating space for the flexible screen, and there is a risk of squeezing the folded portion of the flexible screen. If S2/S1 is excessively large, the area of the recessed portion arranged in the first region is excessively large, resulting in a reduction in the strength of the protective component, which is prone to fracture during the folding process and reduces service life of the display assembly.

In a possible design, in a plane where the third direction and the second direction are located, an area of the second region is S3, and a total area of the recessed portion located in the second region is S4, where $\frac{1}{3} \leq S4/S3 \leq \frac{2}{3}$. If S4/S3 is excessively small, the area of the recessed portion arranged in the second region is excessively small, which causes the bending rigidity of the second region is large. When the display assembly is folded, the deformation amount of the second region after bending is small, the protective component cannot provide sufficient screen accommodating space for the flexible screen, and there is a risk of squeezing the folded portion of the flexible screen. If S4/S3 is excessively large, the area of the recessed portion arranged in the second region is excessively large, resulting in a reduction in the strength of the protective component, which is prone to fracture during the folding process and reduces service life of the display assembly.

In a possible design, in a plane where the third direction and the second direction are located, a total area of the recessed portion located in the first region is S2, and a total area of the recessed portion located in the second region is S4, where $\frac{3}{4} \leq S2/S4 \leq 1$. If S2/S4 is excessively large, the total area of the recessed portion of the first region is greater than the total area of the recessed portion of the second region, so that the bending rigidity of the first region is less than the bending rigidity of the second region, resulting in the bending shape of the bending region tending to be oval, the bending radius of the first region is excessively small, and there is a risk of squeezing the folded portion of the flexible screen. If S2/S4 is excessively small, the total area of the recessed portion of the first region is less than the total area of the recessed portion of the second region, and a difference between the total area of the recessed portion of the two is larger, resulting in the bending rigidity of the first region being much greater than the bending rigidity of the second region. As a result, the deformation amount of the first region during the bending process is excessively small, and there is also a risk of squeezing the folded portion of the flexible screen. Therefore, when $\frac{3}{4} \leq S2/S4 < 1$, the risk of squeezing the flexible screen during the bending process of the protective component can be effectively reduced. In a possible design, when the length of the recessed portion of the first region is the same as the length of the recessed portion of the second region, and the width of the recessed portion of the first region is the same as the width of the recessed portion of the second region, the depth t1 of the recessed portion of the first region is less than the depth t2 of the recessed portion of the second region. If the depth of the recessed portion is small, the thickness of the bottom wall of the recessed portion is large, and a bottom wall of the recessed portion can be configured to withstand the stress during the bending process of the protective component. Therefore, if the thickness of the bottom wall of the recessed portion is large, the cross-sectional area of the protective component to withstand stress is large, the bending rigidity of the protective component in the corresponding area is large, and the deformation amount during bending is small. When t1<t2, the bending rigidity of the first region of the protective component is greater than the bending rigidity of the second region of the protective component.

In a possible design, the recessed portion located in the first region is a groove, and the recessed portion located in the second region is a through hole extending through the protective component in the first direction of the protective component. In this case, the depth of the recessed portion reaches the maximum. Compared with the first region, the bending rigidity of the second region can be further reduced, so that the difference between the bending rigidity of the first region and the bending rigidity of the second region is large. During the folding process of the display assembly, it not only ensures that the protective component has a large degree of deformation when bent, so that a sufficient screen accommodating space can be formed, but also makes the bent shape of the bending region tend to be circular, and the squeezing of the folded portion of the flexible screen by the bending region is reduced.

In a possible design, a first distance A1 is defined between adjacent recessed portions of the first region in the second direction, and a second distance A2 is defined between adjacent recessed portions of the second region in the second direction, where A1>A2. In the second direction X, a larger distance between adjacent recessed portions indicates a larger spacing between the recessed portions in the region, that is, more materials in the region provided with the recessed portion. Moreover, since the region where the recessed portion is not arranged is mainly configured to withstand the stress during the bending process of the protective component, when the material where the recessed portion is not arranged is large, the cross-sectional area of the region where the recessed portion is not arranged is large, and the bending rigidity of the protective component in the corresponding region is large. Since A1>A2, the bending rigidity of the first region is greater than the bending rigidity of the second region.

In a possible design, 1<A1/A2≤1.5. If A1/A2 is excessively small, the bending rigidity of the first region is less than the bending rigidity of the second region. As a result, the bending shape of the bending region tends to be oval, the bending radius of the first region is excessively small, and there is a risk of squeezing the folded portion of the flexible screen; and if A1/A2 is excessively large, the bending rigidity difference between the first region and the second region is large. As a result, the deformation amount of the first region during the bending process is excessively small, and there is also a risk of squeezing the folded portion of the flexible screen. In this way, in a case that 1<A1/A2≤1.5, while the first region has a large deformation amount, a bending radius after bending of the first region can be increased, thereby reducing the squeezing of the folded portion of the flexible screen by the bending region of the protective component.

In a possible design, a size of the recessed portion of the first region in the second direction is B1, and a size of the recessed portion of the second region in the second direction is B2, where B1<B2. In the second direction X, a larger width of a recessed portion indicates fewer material in the region not provided with the recessed portions. Moreover, since the region where the recessed portion is not arranged is mainly configured to withstand the stress during the bending process of the protective component, when the material where the recessed portion is not arranged is few, the cross-sectional area of the region where the recessed portion is not arranged is small, and the bending rigidity of the protective component in the corresponding region is small. Because B1<B2, the bending rigidity of the first region is greater than the bending rigidity of the second region.

In a possible design, 1<B2/B1≤1.5. If B2/B1 is excessively small, the bending rigidity of the first region is less than the bending rigidity of the second region. As a result, the bending shape of the bending region tends to be oval, the bending radius of the first region is excessively small, and there is a risk of squeezing the folded portion of the flexible screen; and if B2/B1 is excessively large, the bending rigidity difference between the first region and the second region is large. As a result, the deformation amount of the first region during the bending process is excessively small, and there is also a risk of squeezing the folded portion of the flexible screen. In this way, in a case that 1<B2/B1≤1.5, while the first region has a large deformation amount, a bending radius after bending of the first region can be increased, thereby reducing the squeezing of the folded portion of the flexible screen by the bending region of the protective component.

In a possible design, a size of the recessed portion of the first region in the third direction is C1, and a size of the recessed portion of the second region in the third direction is C2, where C1<C2. In the third direction, a larger length of the recessed portion leads to fewer materials in the region provided with the recessed portion and less bending rigidity of the protective component in the corresponding region. Because C1<C2, the bending rigidity of the first region is greater than the bending rigidity of the second region.

In a possible design, 1<C2/C1≤1.5. When the value of C2/C1 is excessively small, the bending rigidity of the second region is greater than the bending rigidity of the first region. As a result, the bending shape of the bending region may tend to be oval, the bending radius of the first region is excessively small, and there is a risk of squeezing the folded portion of the flexible screen; and when the value of C2/C1 is excessively large, the bending rigidity difference between the second region and the first region is large. As a result, the deformation amount of the first region during the bending process is excessively small, and there is also a risk of squeezing the folded portion of the flexible screen. In this way, in a case that 1<C2/C1≤1.5, while the first region has a large deformation amount, a bending radius after bending of the first region can be increased, thereby reducing the squeezing of the folded portion of the flexible screen by the bending region of the protective component.

In a possible design, a third distance A3 is defined between adjacent recessed portions of the first region in the third direction, and a fourth distance A4 is defined between adjacent recessed portions of the second region in the third direction, where A3>A4. In the third direction, a larger distance between adjacent recessed portions indicates larger material in the region not provided with the recessed portions and a higher bending rigidity of the protective component in the corresponding region. Since A3>A4, the bending rigidity of the first region is greater than the bending rigidity of the second region.

In a possible design, 1<A3/A4≤1.5. If A3/A4 is excessively small, the bending rigidity of the first region is less than the bending rigidity of the second region. As a result, the bending shape of the bending region tends to be oval, the bending radius of the first region is excessively small, and there is a risk of squeezing the folded portion of the flexible screen; and if A3/A4 is excessively large, the bending rigidity difference between the first region and the second region is large. As a result, the deformation amount of the first region during the bending process is excessively small, and there is also a risk of squeezing the folded portion of the flexible screen. In this way, in a case that 1<A3/A4≤1.5, while the first region has a large deformation amount, a bending radius after bending of the first region can be increased, thereby reducing the squeezing of the folded portion of the flexible screen by the bending region of the protective component.

In a possible design, the second region includes at least a first layer and a second layer stacked on each other in the first direction, the first region includes a third layer, and a thickness of the third layer is the same as a sum of thicknesses of the first layer and the second layer; and an elastic modulus of materials of the first layer and the third layer is greater than an elastic modulus of a material of the second layer. That is to say, an overall elastic modulus of the first region is greater than an overall elastic modulus of the second region. When the cross-sectional area is the same, a large elastic modulus leads to a large bending rigidity and a small deformation degree. Therefore, the bending rigidity of the first region is greater than the bending rigidity of the second region, thereby reducing the risk that the radius of the screen accommodating space formed by the excessive deformation amount of the first region during the folding process is excessively small.

In a possible design, a width of the first region is D1, and a width of the bending region of the protective component is D2, where ½≤D1/D2≤⅔. When the value of D1/D2 is excessively large, the size of the first region in the second direction X is excessively large, and the bending rigidity of the first region is greater than the bending rigidity of the second region. That is to say, in the bending region, the ratio of the region having a large bending rigidity is excessively large, which causes an overall deformation amount of the bending region is excessively small during the folding process. As a result, the bending region cannot provide enough screen accommodating space for the folded portion of the flexible screen, and increases bending difficulty of the display assembly; and when the value of D1/D2 is excessively small, the size of the first region in the second direction is excessively small, and the bending rigidity of the first region is greater than the bending rigidity of the second region. That is to say, in the bending region, the ratio of the first region having a large bending rigidity is excessively small, so that the first region cannot provide effective support during the folding process, the bending radius of the bending region cannot be effectively increased, and the flexible screen is squeezed.

In a possible design, a thickness of at least part of the second region is less than a thickness of the first region in the first direction. That is to say, the second region has a thinned region. since the arrangement of the thinned region, the material used in the second region to withstand the stress during the bending process of the protective component is less than that of the first region, so that the bending rigidity of the second region is smaller than the bending rigidity of the first region.

A second aspect of this application provides a foldable electronic device, including: a housing; and a display assembly, where the display assembly is the display assembly according to any one of the above, and the display assembly is mounted to the housing. The housing includes a first housing and a second housing. In the expanded state, the first housing and the second housing are substantially in the same plane, so that the flexible screen is substantially planar. In this case, the flexible screen is exposed, a user can operate the flexible screen, and the flexible screen can display information such as the image or the video to achieve a large screen display and improve viewing experience of the user. In the folded state, the flexible screen is located in space enclosed by the first housing and the second housing after folding. In this case, the flexible screen is not exposed, the user cannot operate the flexible screen, and the electronic device is easy to store and carry.

It should be understood that the foregoing general descriptions and the following detailed descriptions are only exemplary, and cannot limit this application.

REFERENCE NUMERALS

1a—Protective component;
11a—Recessed portion;
12a—First region;
13a—Drive component;
14a—Mounting component;
15a—Circuit board;
2a—Flexible screen;
1—Protective component;
11—Recessed portion;
111—Through hole;
112—Groove;
12—First region
13—Second region
14—Outer region;
15—First layer;
16—Second layer;
17—Third layer;
18—Thinned region
2—Flexible screen;
21—First portion;
22—Second portion;
23—Folded portion;
231—First folded portion;
232—Second folded portion.

Accompanying drawings herein are incorporated into the specification and constitute a part of this specification, show embodiments that conform to this application, and are used for describing a principle of this application together with this specification.

DESCRIPTION OF EMBODIMENTS

To better understand the technical solutions of this application, the embodiments of this application are described in detail below with reference to the accompanying drawings.

Figure 1:
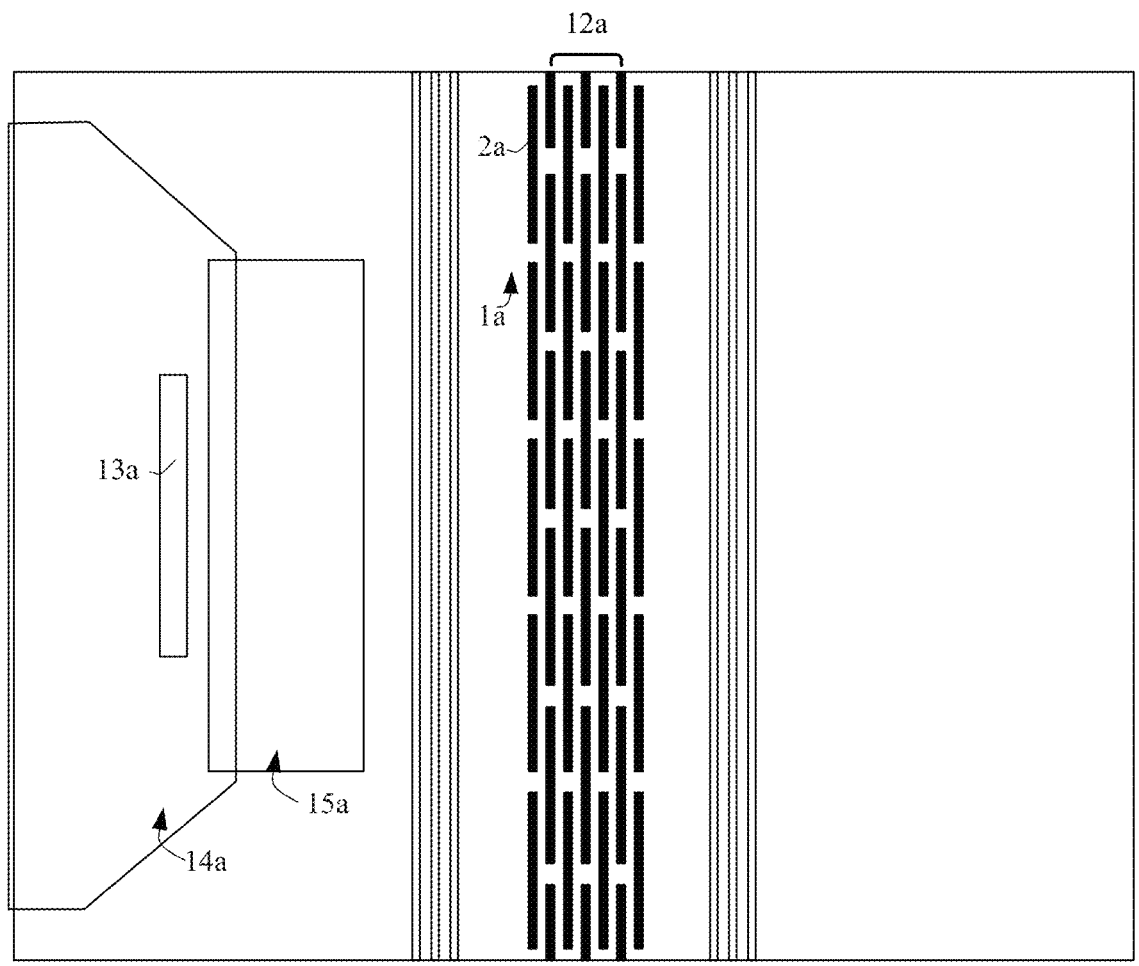
FIG. 1 is a partial structural diagram of a foldable electronic device in the prior art.

FIG. 1 is a partial structural diagram of a foldable electronic device. The foldable electronic device includes a display assembly, a drive IC 13a (drive IC), a mounting component 14a, a circuit board 15a, and the like. The display assembly includes a foldable flexible screen 2a and a protective component 1a for protecting the flexible screen 2a. The mounting component 14a can mount the flexible screen 2a to the protective component 1a through a chip on plastic (chip on plastic, COP) package or another packaging manner. The drive IC 13a is electrically connected to the circuit board 15a and the flexible screen 2a for driving the display of the flexible screen 2a, and the circuit board 15a may be a flexible printed circuit board (flexible printed circuit board, FPC).

Figure 2:
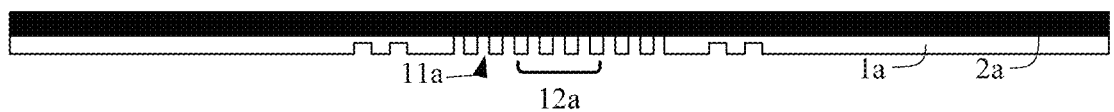
FIG. 2 is a schematic structural diagram of a display assembly in FIG. 1 in an expanded state.

A structure of the display assembly in FIG. 1 in an expanded state is shown in FIG. 2. During the folding process of the foldable electronic device, the protective component 1a and the flexible screen 2a are both folded, and a bending region of the protective component 1a is folded to form a screen accommodating space for accommodating a folding region of the flexible screen 2a. In order to increase a deformation amount of the bending region of the protective component 1a to increase the screen accommodating space, a recessed portion 11a is usually etched and processed in the bending region of the protective component 1a, thereby reducing a bending rigidity of the bending region. As a result, the protective component 1a is greatly deformed during the bending process, thereby increasing the screen accommodating space to a certain extent, and reducing pulling and squeezing of the flexible screen 2a by the bending region of the protective component 1a.

Figure 3:
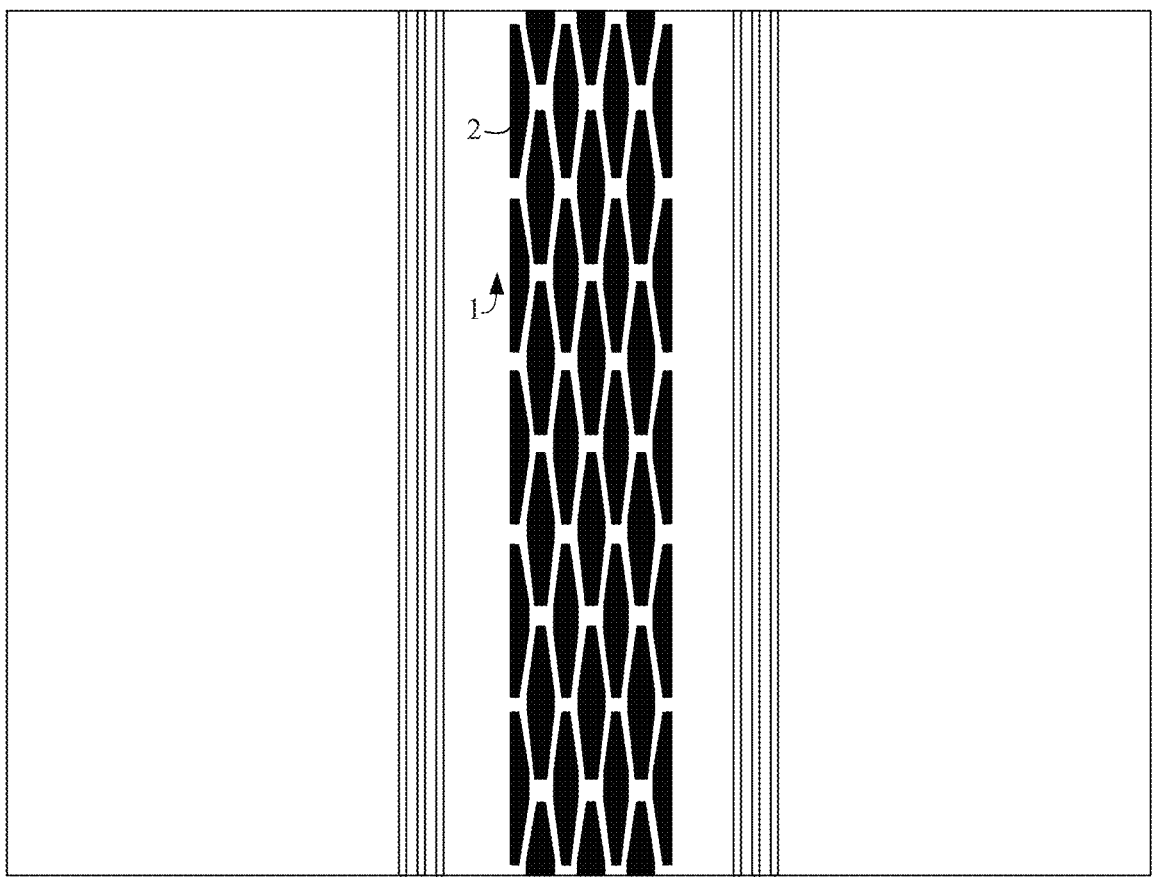
FIG. 3 is an effect diagram showing the display assembly in FIG. 2 in the expanded state.

FIG. 3 is an effect diagram showing the display assembly in FIG. 1 in the expanded state. The protective component 1a is stretched in a width direction, and the recessed portion 11a is deformed and a volume increases. Correspondingly, when the protective component 1a is bent, the volume of the recessed portion 11a also increases, providing the screen accommodating space for the bent flexible screen 2a, and reducing the pulling and squeezing of the flexible screen 2a by the bending region of the protective component 1a.

The bending region of the flexible screen 2a and the bending region of the protective component 1a are usually bent into an arc-shaped structure. Besides, if a radius of the arc-shaped structure formed after the bending region of the protective component 1a is bent is small, the screen accommodating space is small, and the squeezing of the flexible screen 2a is large. Therefore, in order to reduce the squeezing of the flexible screen 2a by the protective component 1a, the radius of the arc-shaped structure after the protective component 1a is bent should be larger.

Figure 4:
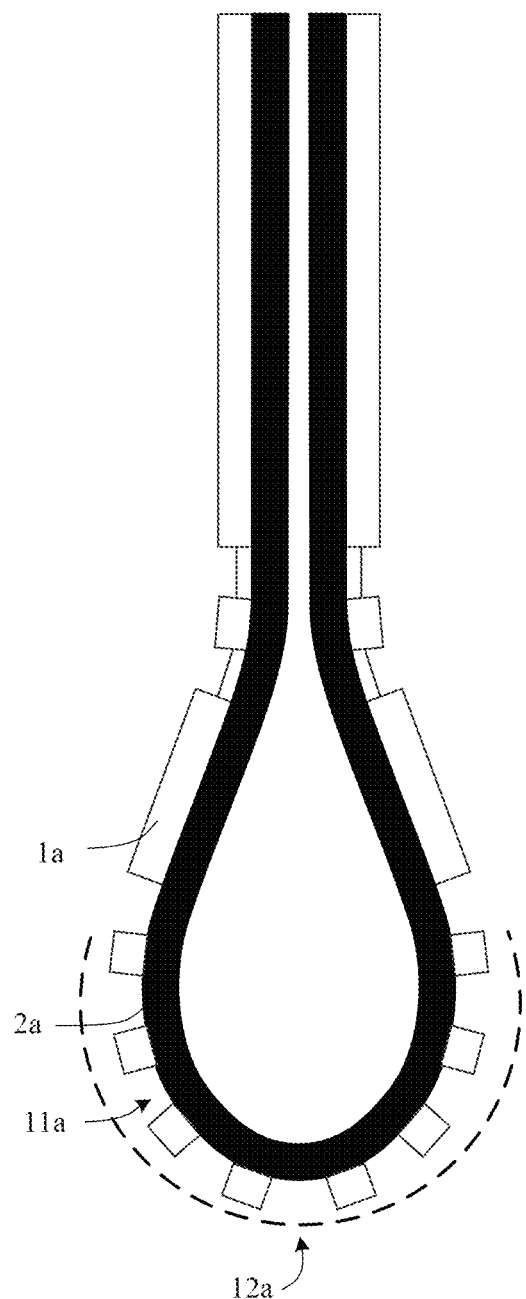
FIG. 4 is a schematic structural diagram of the display assembly in FIG. 2 in a bent state.

FIG. 4 is a schematic structural diagram of the display assembly in FIG. 1 in a bent state. The dashed line shows an ideal state of the first region 12a of the bending region of the protective component 1a during bending. The deformation amount of the first region 12a of the bending region of the protective component 1a is the largest in the folded state, and when the deformation amount of the first region 12a is excessively large (the bending is excessively large), the radius of the arc-shaped structure formed is excessively small. That is to say, the radius after the actual bending of the first region 12a is less than the ideal radius shown by the dashed line, and the shape after bending is often oval (different from the shape of the ideal state after bending is circular), which led to an excessive squeezing of the flexible screen 2a, and there is a risk of layer separation and fracturing of the flexible screen 2a.

In order to solve this technical problem, an embodiment of this application provides a foldable electronic device. The foldable electronic device includes, for example, a mobile phone, a tablet computer, a personal digital assistant (personal digital assistant, PDA), a notebook computer, an on-board computer, a foldable display device, a foldable display screen, a wearable device, and any other device having a foldable screen function. The embodiments of this application do not impose special restrictions on the specific form of the foldable electronic device. For ease of description, the following provides description by using an example in which the foldable electronic device is the mobile phone. The foldable electronic device of this application is described below with a specific embodiment.

The foldable electronic device includes a folding apparatus, a first housing, a second housing, and a display assembly. The display assembly includes a flexible screen configured to display an image, a video, and the like. A specific type of the flexible screen of this application is not limited. For example, the flexible screen may be an active matrix organic light-emitting diode display screen or an active-matrix organic light-emitting diode (active-matrix organic light-emitting diode, AMOLED) display screen. As a self-light-emitting display screen, a back light module (back light module, BLM) is not necessarily to be arranged on the AMOLED display screen. Therefore, when a substrate in the AMOLED display screen is made of a flexible resin material, such as polyethylene terephthalate (polyethylene terephthalate, PET), the AMOLED display screen can have a property of being bendable. For example, the flexible screen 2 may also be an organic light-emitting diode (organic light-emitting diode, OLED) display screen, a mini organic light-emitting diode (mini organic light-emitting diode) display, a micro organic light-emitting diode (micro organic light-emitting diode) display, a micro organic light-emitting diode (micro organic light-emitting diode) display, or a quantum dot light-emitting diode (quantum dot light emitting diodes, QLED) display, and the like.

The first housing (not shown in the figure) and the second housing (not shown in the figure) are spaced apart, and the first housing and the second housing can also be middle frame structure of the foldable electronic device. The first housing and the second housing are configured to mount a battery, a circuit board, a camera, a headset, a handset, a button, and another component of the electronic device, and the first housing and the second housing are further configured to bear the flexible screen. That is to say, the flexible screen is fixedly connected (for example, pasted) to the first housing and the second housing, so that the flexible screen is kept as flat as possible during use, and a non-display surface of the flexible screen is protected. A folding apparatus (not shown in the figure) is located between the first housing and the second housing and is connected to the first housing and the second housing.

Figure 6:
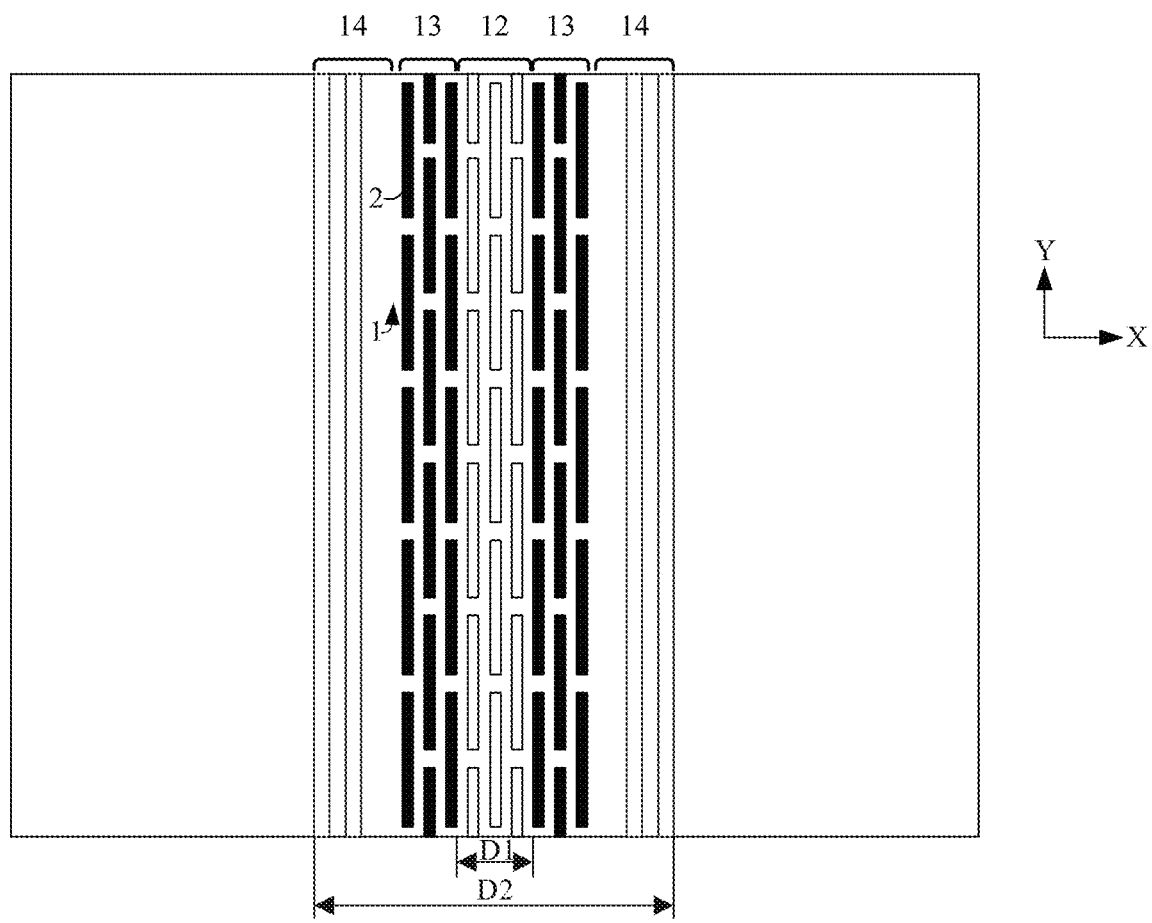
FIG. 6 is a bottom view of FIG. 5.
Figure 8:
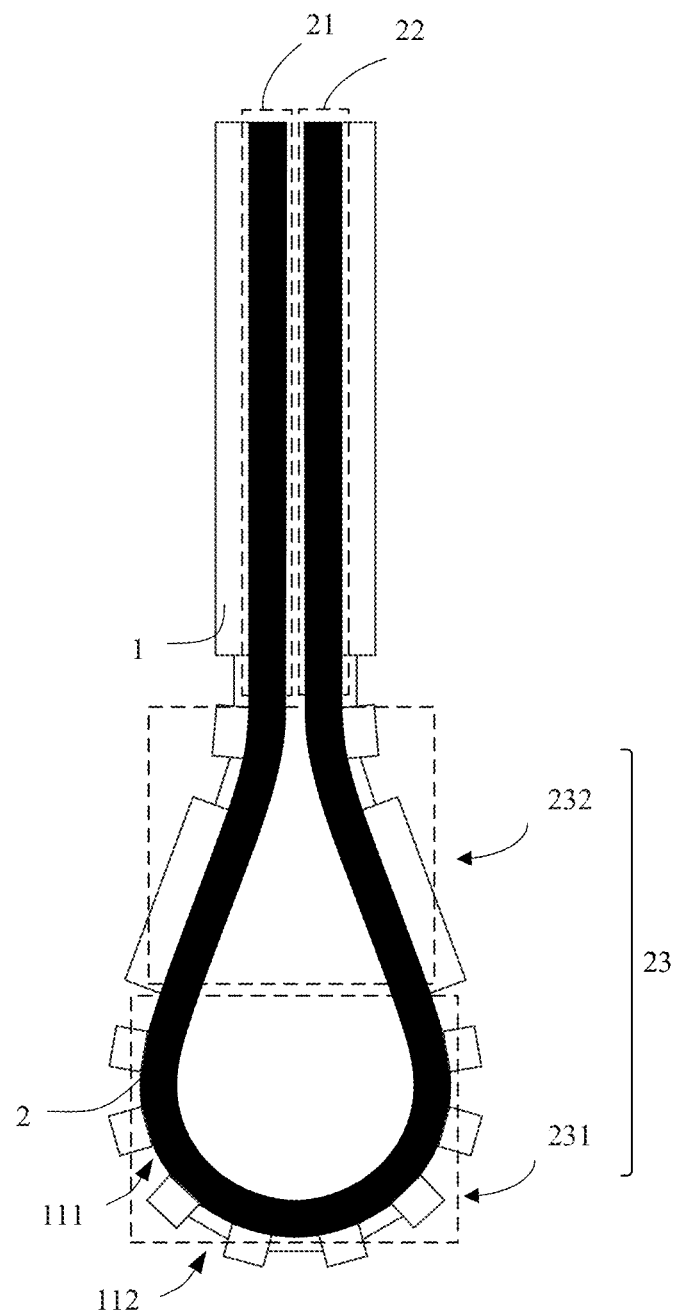
FIG. 8 is a schematic structural diagram of the display assembly in FIG. 5 in a bent state.

During the use of the foldable electronic device, the display assembly at least includes the expanded state shown in FIG. 6 and the folded state shown in FIG. 8. In the expanded state, the first housing and the second housing are substantially in the same plane, so that the flexible screen 2 is substantially planar. In this case, the flexible screen 2 is exposed, a user can operate the flexible screen 2, and the flexible screen 2 can display information such as the image or the video to achieve a large screen display and improve viewing experience of the user. Moreover, when the display assembly is in the expanded state, the first housing and the second housing can rotate toward each other (that is, a relative rotation of the first housing and the second housing close to each other), thereby driving the display assembly to fold. As a result, the display assembly is in the folded state shown in FIG. 8, and the display assembly in this embodiment is an inner folding structure of the flexible screen 2. In the folded state, the flexible screen 2 is located in space enclosed by the first housing and the second housing after folding. In this case, the flexible screen 2 is not exposed, the user cannot operate the flexible screen 2, and the electronic device is easy to store and carry. Moreover, when the display assembly is in the folded state, the first housing and the second housing can be rotated (a rotational direction is opposite to the rotational direction when folded), so that the display assembly is in the expanded state shown in FIG. 6.

Figure 5:
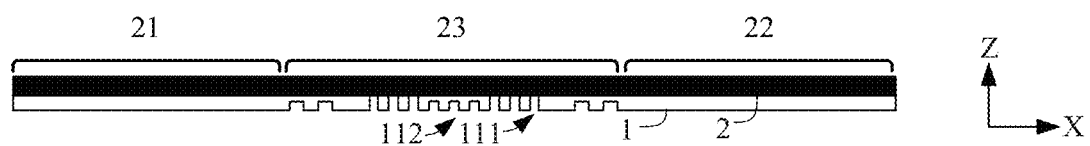
FIG. 5 is a schematic structural diagram of a display assembly in a specific embodiment according to this application, where the display assembly is in an expanded state.

FIG. 5 is a schematic structural diagram of a display assembly according to this application. The flexible screen 2 may include a first portion 21, a second portion 22 and a folded portion 23 located therebetween. The first portion 21 corresponds to and is connected to the first housing, the second portion 22 corresponds to and is connected to the second housing, and the folded portion 23 corresponds to the folding apparatus. During the folding process of the folding apparatus, the folded portion 23 is folded to form the folded portion 23 of the flexible screen 2 as shown in FIG. 8. In the embodiment of this application, the description is made by using a first direction Z as a thickness direction of the protective component 1, a second direction X as a width direction of the protective component 1, and a third direction Y as a length direction of the protective component 1 as examples.

As shown in FIG. 5, the display assembly further includes a protective component 1. The protective component 1 is located on a side of the flexible screen 2 away from a display surface, and is configured to protect the flexible screen 2. When the display assembly is bent, the protective component 1 and the flexible screen 2 are bent, the bending region of the protective component 1 corresponds to the folded portion 23 of the flexible screen 2, and the bending region of the protective component 1 is bent to form a screen accommodating space for accommodating the folded portion 23 of the flexible screen 2.

FIG. 6 is a bottom view of FIG. 5. The bending region of the protective component 1 includes a first region 12 and second regions 13 located on two sides of the first region 12 in a second direction X; and when the display assembly is bent, the first region 12 has a smaller average deformation amount than each second region 13 in the second direction X. An average deformation amount of the first region 12 according to the embodiment of this application is defined as: a deformation amount per unit length of the first region 12 in the second direction X of the protective component 1 after the display assembly is bent; and an average deformation amount of the second region 13 according to the embodiment of this application is defined as: a deformation amount per unit length of the second region 13 in the second direction X of the protective component 1 after the display assembly is bent; and In this embodiment, the bending region of the protective component 1 forms a screen accommodating space for accommodating the folded portion 23 of the flexible screen 2 when the display assembly is in the folded state. Under an action of the same external force, the average deformation of the first region 12 is less than the average deformation of the second region 13, thereby reducing a risk that the radius of the screen accommodating space formed by the average deformation amount of the first region 12 is excessively large during the folding process, and increasing the bending radius after the deformation of the bending region. Further, under the squeezing action of the protective component 1 on the flexible screen 2, the risk of layer separation and fracturing of the flexible screen 2 is reduced, and service life and reliability of the display assembly are improved.

In a specific embodiment, when the display assembly is bent, a bending rigidity of the first region 12 is greater than a bending rigidity of the second region 13. The bending rigidity described herein is specifically the bending rigidity in the second direction X, and the bending rigidity is proportional to the radius of the protective component 1 after bending, specifically:

$1/\rho = M/(EI)$ $\rho$ is a radius of the bending region of the protective component 1 after bending, M is a maximum bending moment received by protective component 1, and EI is a cross-sectional bending rigidity of the protective component 1. Moreover, the deformation amount of the protective component 1 during bending has an opposite change relationship with the bending rigidity. That is to say, under the action of the same bending moment, a larger deformation amount leads to a smaller bending rigidity for the same material. When the display assembly is in the expanded state as shown in FIG. 5 and FIG. 6, arrangement directions of the first portion 21, the folded portion 23, and the second portion 22 of the flexible screen 2 are defined as the second direction X (presented in FIG. 5 and FIG. 6 as left-right direction); in the plane where the flexible screen 2 (the expanded state) is located, the direction perpendicular to the arrangement directions of the first portion 21, the folded portion 23, and the second portion 22 is defined as the third direction Y (presented as a vertical direction in FIG. 6); and the direction perpendicular to both the second direction X and the third direction Y is defined as the first direction Z (presented as a vertical direction in FIG. 5).

In this embodiment, the bending region of the protective component 1 forms a screen accommodating space for accommodating the folded portion 23 of the flexible screen 2 when the display assembly is in the folded state. Moreover, the first region 12 of the bending region of the protective component 1 has the largest deformation amount when the display assembly is in the folded state, the bending rigidity of the first region 12 is greater than the bending rigidity of the second region 13 in the second direction X, and the deformation amount of the first region 12 is less than the deformation amount of the second region 13 under an action of the same external force, thereby reducing a risk that the radius of the screen accommodating space formed by the deformation amount of the first region 12 is excessively large during the folding process, and increasing the bending radius after the deformation of the bending region. Further, under the squeezing action of the protective component 1 on the flexible screen 2, the risk of layer separation and fracturing of the flexible screen 2 is reduced, and service life and reliability of the display assembly are improved.

The protective component 1 may specifically be a metal sheet, and the protective component 1 may be pasted on a side of the flexible screen 2 facing away from a display terminal in the first direction Z, so as to protect the flexible screen 2 through the protective component 1.

In the above embodiments, the first region 12 and the second region 13 with different bending rigidity in the bending region of the protective component 1 can be realized in various manners. Different implementations of the first region 12 and the second region 13 with different bending rigidity are described in detail below.

Specifically, as shown in FIG. 5, FIG. 9, FIG. 13, and FIG. 18, FIG. 9, FIG. 13, and FIG. 18 are schematic structural diagrams of the display assembly in different specific embodiments according to this application. A plurality of recessed portions 11 recessed in the first direction Z is arranged on the bending region of the protective component 1, and the plurality of recessed portions 11 are spaced apart in the second direction X and the third direction Y. The arrangement of the recessed portion 11 reduces a cross-sectional area of the protective component 1 to withstand stress during the bending process, thereby reducing the bending rigidity of the bending region, so that the bending region of the protective component 1 can be greatly deformed during the folding process, the screen accommodating space for accommodating the folded portion 23 of the flexible screen 2 is formed, and the folding of the electronic device is realized. Each recessed portion 11 can reduce the squeezing of the folded portion 23 of the flexible screen 2 by the protective component 1, and reduce the risk of layer separation and fracturing of the flexible screen 2. Meanwhile, when the recessed portion 11 is arranged on the protective component 1, the first region 12 and the second region 13 with different bending rigidity can also be easily achieved by changing a size of the recessed portion 11.

In a specific embodiment, in a plane where the third direction Y and the second direction X are located, an area of the first region 12 is S1, and a total area of the recessed portion 11 located in the first region 12 is S2, where $1/4 \leq S2/S1 \leq 2/3$. For example, S2/S1 may specifically be 1/4, 3/8, 1/2, 2/3, and the like.

A ratio of a total area S2 of the recessed portion 11 located in the first region 12 to an area S1 of the first region 12 should not be excessively large or excessively small. If S2/S1 is excessively small (for example, less than 1/4), the area of the recessed portion 11 arranged in the first region 12 is excessively small, which causes the bending rigidity of the first region 12 is large. When the display assembly is folded, the deformation amount of the first region 12 after bending is small, the protective component 1 cannot provide sufficient screen accommodating space for the flexible screen 2, and there is a risk of squeezing the folded portion 23 of the flexible screen 2. If S2/S1 is excessively large (for example, greater than 2/3), the area of the recessed portion 11 arranged in the first region 12 is excessively large, resulting in a reduction in the strength of the protective component 1, which is prone to fracture during the folding process and reduces service life of the display assembly.

In a specific embodiment, in the plane where the third direction Y and the second direction X are located, an area of the second region 13 is S3, and a total area of the recessed portion 11 located in the second region 13 is S4, where $1/3 \leq S4/S3 \leq 2/3$. For example, S4/S3 may specifically be 1/3, 3/8, 1/2, 2/3, and the like.

A ratio of a total area S4 of the recessed portion 11 located in the second region 13 to an area S3 of the second region 13 should not be excessively large or excessively small. If S4/S3 is excessively small (for example, less than 1/3), the area of the recessed portion 11 arranged in the second region 13 is excessively small, which causes the bending rigidity of the second region 13 is large. When the display assembly is folded, the deformation amount of the second region 13 after bending is small, the protective component 1 cannot provide sufficient screen accommodating space for the flexible screen 2, and there is a risk of squeezing the folded portion 23 of the flexible screen 2. If S4/S3 is excessively large (for example, greater than 2/3), the area of the recessed portion 11 arranged in the second region 13 is excessively large, resulting in a reduction in the strength of the protective component 1, which is prone to fracture during the folding process and reduces service life of the display assembly.

Meanwhile, $3/4 \leq S2/S4 < 1$. For example, S2/S4 may specifically be 3/4, 1/2, 5/8, and the like. In the first direction, a depth of the recessed portion 11 of the first region 12 is the same as a depth of the recessed portion 11 of the second region 13.

The total area S2 of the recessed portion 11 located in the first region 12 is related to the bending rigidity of the first region 12, and the total area S4 of the recessed portion 11 located in the second region 13 is related to the bending rigidity of the first region 12. A larger S2 leads to a smaller bending rigidity of the first region 12, and a larger S4 leads to a larger bending rigidity of the second region 13. Therefore, the magnitude of S2/S4 can represent the magnitude of the bending rigidity of the first region 12 and the bending rigidity of the second region 13. If S2/S4 is excessively large (for example, greater than 1), the total area of the recessed portion 11 of the first region 12 is greater than the total area of the recessed portion 11 of the second region 13, so that the bending rigidity of the first region 12 is less than the bending rigidity of the second region 13, resulting in the bending shape of the bending region tending to be oval, the bending radius of the first region 12 is excessively small, and there is a risk of squeezing the folded portion 23 of the flexible screen 2. If S2/S4 is excessively small (for example, less than 3/4), the total area of the recessed portion 11 of the first region 12 is less than the total area of the recessed portion 11 of the second region 13, and a difference between the total area of the recessed portion 11 of the two is larger, resulting in the bending rigidity of the first region 12 being much greater than the bending rigidity of the second region 13. As a result, the deformation amount of the first region 12 during the bending process is excessively small, and there is also a risk of squeezing the folded portion 23 of the flexible screen 2. Therefore, when $3/4 \leq S2/S4 < 1$, the risk of squeezing the flexible screen 2 during the bending process of the protective component 1 can be effectively reduced.

Figure 7:
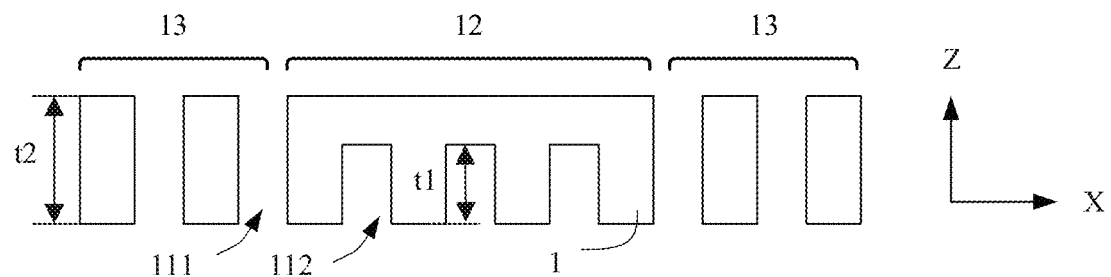
FIG. 7 is a schematic structural diagram of a bending region of the protective component in FIG. 5.

In a specific embodiment, FIG. 7 is a schematic structural diagram of a bending region of the protective component 1 in FIG. 5. When the length of the recessed portion 11 of the first region 12 is the same as the length of the recessed portion 11 of the second region 13, and the width of the recessed portion 11 of the first region 12 is the same as the width of the recessed portion 11 of the second region 13, the depth t1 of the recessed portion 11 of the first region 12 is less than the depth t2 of the recessed portion 11 of the second region 13.

In this embodiment, a smaller depth of the recessed portion 11 leads to a larger thickness of the bottom wall of the recessed portion 11, and a bottom wall of the recessed portion 11 can be configured to withstand the stress during the bending process of the protective component 1. Therefore, if the thickness of the bottom wall of the recessed portion 11 is large, the cross-sectional area of the protective component 1 to withstand stress is large, the bending rigidity of the protective component 1 in the corresponding area is large, and the deformation amount during bending is small. When the depth t1 of the recessed portion 11 of the first region 12 is less than the depth t2 of the recessed portion 11 of the second region 13, the bending rigidity of the first region 12 of the protective component 1 is caused to be greater than the bending rigidity of the second region 13 of the protective component 1. Therefore, when the external force received by the protective component 1 is the same, the deformation amount of the first region 12 is less than the deformation amount of the second region 13. In this embodiment, by changing the depths of the recessed portions 11 in different regions, the first region 12 and the second region 13 with different bending rigidity can be easily realized, and the structure of the protective component 1 can be simplified.

Optionally, the change of the depth t1 of the recessed portion 11 of the first region 12 to the depth t2 of the recessed portion 11 of the second region 13 can be set as a gradual change form. That is to say, in the second direction X, the depth of the recessed portion 11 gradually increases from a center of the first region 12 to both sides of the second region 13 away from the first region 12, so that the bending rigidity change of the protective component 1 is relatively gentle, and the stress concentration caused by a sudden change of the bending radius in the first region 12 and the second region 13 during bending is reduced, thereby increasing service life of the protective component 1.

Specifically, In the embodiment shown in FIG. 7, the recessed portion 11 located in the first region 12 is a groove 112, and the recessed portion 11 located in the second region 13 is a through hole 111. That is to say, the recessed portion 11 located in the second region 13 extends through the protective component 1 in the first direction Z, and the recessed portion 11 located in the first region 12 does not protective component the protective component 1.

In this embodiment, when the recessed portion 11 of the second region 13 is the through hole 111, the depth of the recessed portion 11 reaches the maximum. Compared with the first region 12, the bending rigidity of the second region 13 can be further reduced, so that the difference between the bending rigidity of the first region 12 and the bending rigidity of the second region 13 is large. During the folding process of the display assembly, it not only ensures that the protective component 1 has a large degree of deformation when bent, so that a sufficient screen accommodating space can be formed, but also makes the bent shape of the bending region tend to be circular, and the squeezing of the folded portion 23 of the flexible screen 2 by the bending region is reduced. In addition, when the recessed portion 11 of the second region 13 is the through hole 111, the processing of the protective component 1 can also be simplified, and the processing accuracy can be reduced.

Figure 9:
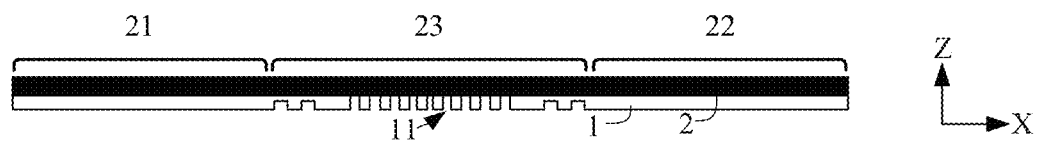
FIG. 9 is a schematic structural diagram of a display assembly in a second specific embodiment according to this application, where the display assembly is in an expanded state.
Figure 10:
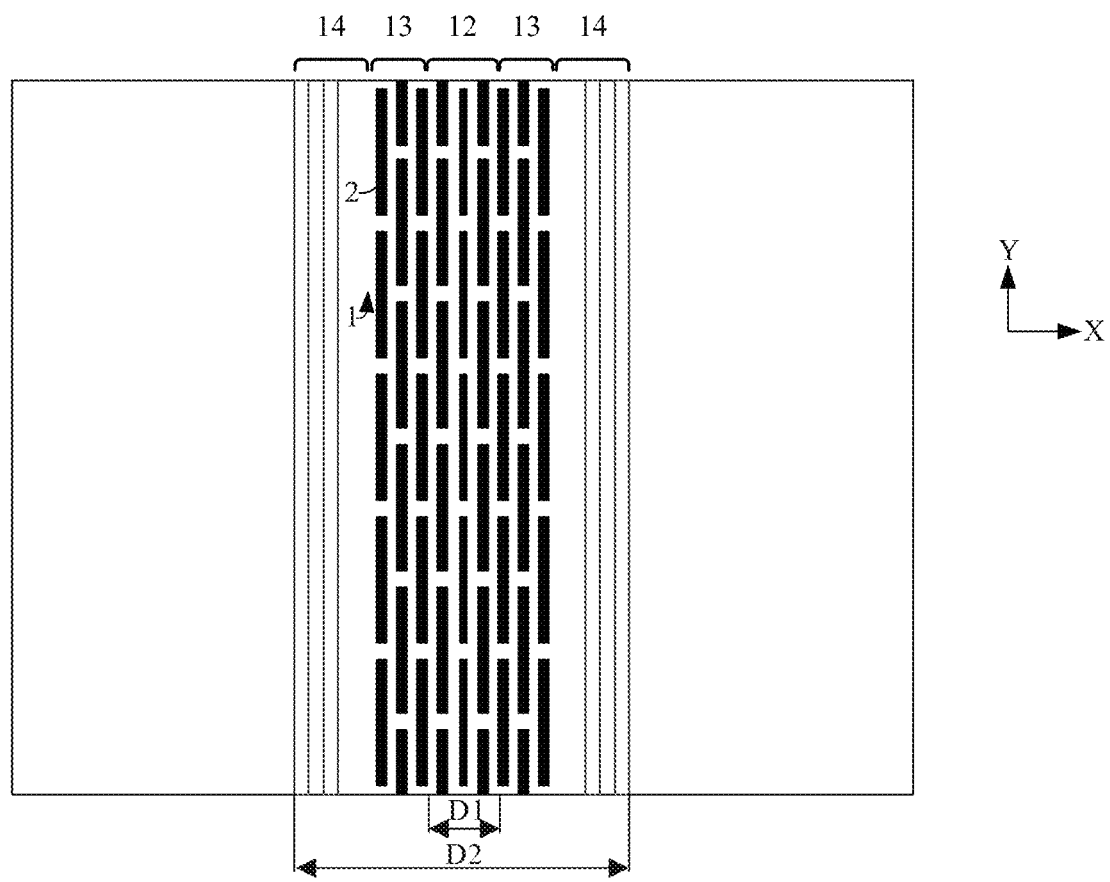
FIG. 10 is a bottom view of FIG. 9.
Figure 11:
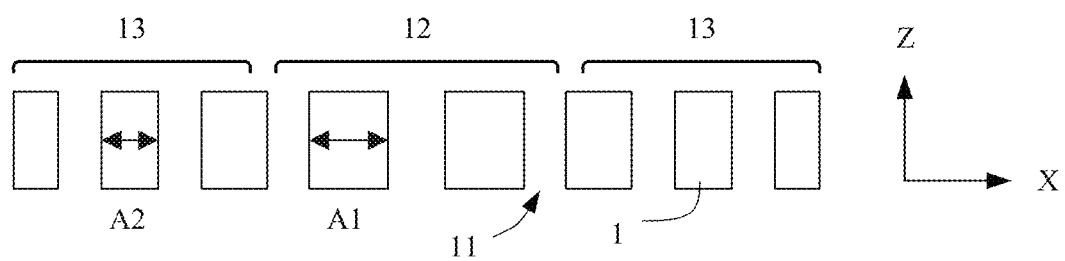
FIG. 11 is a schematic structural diagram of a bending region of the protective component in FIG. 9.

In a second specific embodiment, as shown in FIG. 9 to FIG. 11, FIG. 9 is a schematic structural diagram of a display assembly in a second specific embodiment, FIG. 10 is a bottom view of FIG. 9, and FIG. 11 is a schematic structural diagram of a bending region of the protective component 1. A first distance A1 is defined between adjacent recessed portions 11 of the first region 12 in the second direction X, a second distance A2 is defined between adjacent recessed portions 11 of the second region 13 in the second direction X, where A1>A2. A1 and A2 are minimum distances between adjacent recessed portions 11 on the protective component 1 in the second direction X of the protective component 1.

In this embodiment, in the second direction X, a larger distance between adjacent recessed portions 11 in a region indicates a larger spacing between the recessed portions 11 in the region, that is, more material in the region not provided with the recessed portions 11. Moreover, since the region where the recessed portion 11 is not arranged is mainly configured to withstand the stress during the bending process of the protective component 1, when the material where the recessed portion 11 is not arranged is large, the cross-sectional area of the region where the recessed portion 11 is not arranged is large, and the bending rigidity of the protective component 1 in the corresponding region is large. Because the first distance A1 is greater than the second distance A2, the bending rigidity of the first region 12 is greater than the bending rigidity of the second region 13. In this embodiment, by changing the distance between the recessed portions 11 in the first region 12 and the second region 13 of the protective component 1 in the second direction X, the bending rigidity of the first region 12 can be easily realized to be greater than the bending rigidity of the second region 13, and the structure of the protective component 1 can be simplified.

Specifically, 1<A1/A2≤1.5. For example, A1/A2 may specifically be 1.2, 1.3, 1.4, 1.5, and the like.

Figure 13:
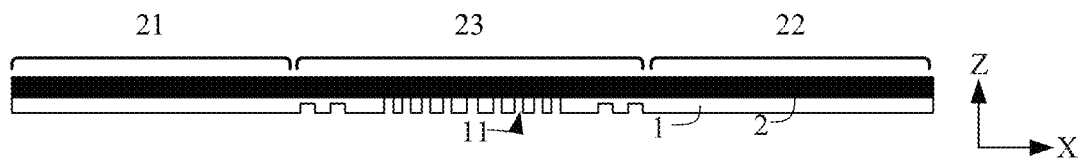
FIG. 13 is a schematic structural diagram of a display assembly in a third specific embodiment according to this application, where the display assembly is in an expanded state.
Figure 14:
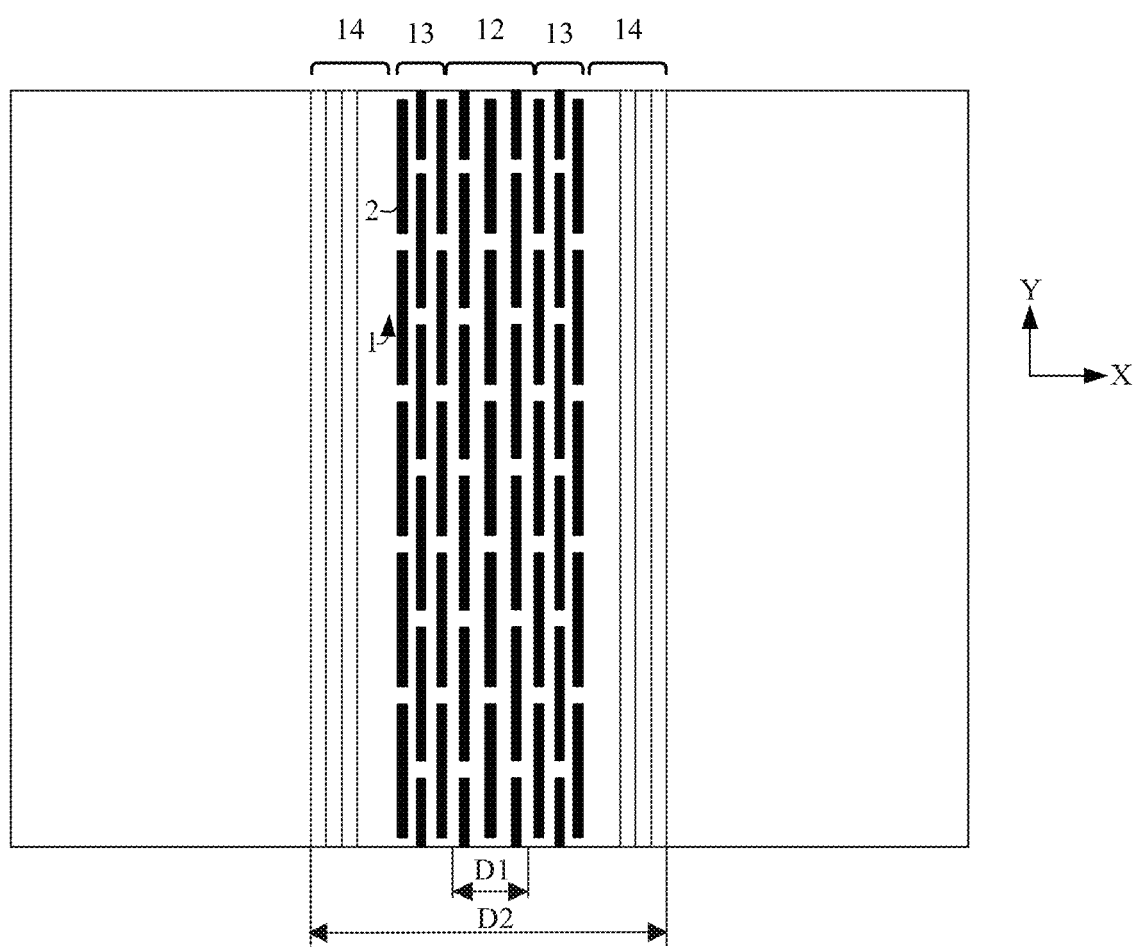
FIG. 14 is a bottom view of FIG. 13.
Figure 15:
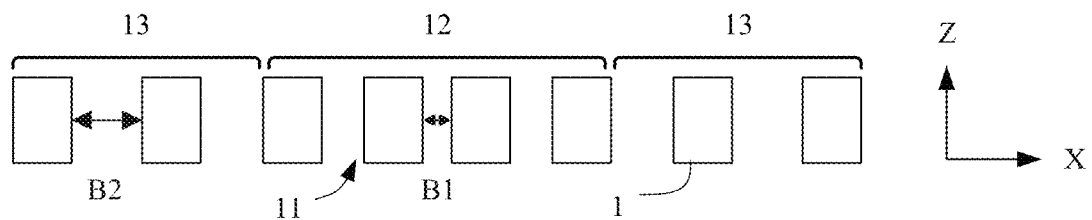
FIG. 15 is a schematic structural diagram of a bending region of the protective component in FIG. 13.

The ratio of the first distance A1 and the second distance A2 should not be excessively large or excessively small. If A1/A2 is excessively small (for example, less than 1), the bending rigidity of the first region 12 is less than the bending rigidity of the second region 13. As a result, the bending shape of the bending region tends to be oval, the bending radius of the first region 12 is excessively small, and there is a risk of squeezing the folded portion 23 of the flexible screen 2; and if A1/A2 is excessively large (for example, greater than 1.5), the bending rigidity difference between the first region 12 and the second region 13 is large. As a result, the deformation amount of the first region 12 during the bending process is excessively small, and there is also a risk of squeezing the folded portion 23 of the flexible screen 2. In this way, in a case that 1<A1/A2≤1.5, while the first region 12 has a large deformation amount, a bending radius after bending of the first region 12 can be increased, thereby reducing the squeezing of the folded portion 23 of the flexible screen 2 by the bending region of the protective component 1. In a third specific embodiment, as shown in FIG. 13 to FIG. 15, FIG. 13 is a schematic structural diagram of a display assembly in a third specific embodiment, FIG. 14 is a bottom view of FIG. 13, and FIG. 15 is a schematic structural diagram of a bending region of the protective component 1 in FIG. 13. A size of the recessed portion 11 of the first region 12 in the second direction X is B1, and a size of the recessed portion 11 of the second region 13 in the second direction X is B2, where B1>B2. B1 and B2 are the maximum distances of the recessed portion 11 on the protective component 1 in the second direction X.

In this embodiment, in the second direction X, a larger width of the recessed portion 11 indicates fewer material in the region not provided with the recessed portions 11. since the region where the recessed portion 11 is not arranged is mainly configured to withstand the stress during the bending process of the protective component 1, when the material where the recessed portion 11 is not arranged is few, the cross-sectional area of the region where the recessed portion 11 is not arranged is small, and the bending rigidity of the protective component 1 in the corresponding region is small. Since the width dimension B1 of the recessed portion 11 of the first region 12 in the second direction X of the protective component 1 is less than the width dimension B2 of the recessed portion 11 of the second region 13, the bending rigidity of the first region 12 is greater than the bending rigidity of the second region 13. In this embodiment, by changing the size between the recessed portions 11 in the first region 12 and the second region 13 of the protective component 1 in the second direction X, the bending rigidity of the first region 12 can be easily realized to be greater than the bending rigidity of the second region 13, the structure of the protective component 1 can be simplified, and the size of the bending rigidity of the two regions can be visually represented.

Specifically, 1<B2/B1≤1.5. For example, B2/B1 may specifically be 1.2, 1.3, 1.4, 1.5, and the like.

In the second direction X, a value of the width dimension B2/B1 of the recessed portion 11 should not be excessively large or excessively small. If B2/B1 is excessively small (for example, less than 1), the bending rigidity of the first region 12 is less than the bending rigidity of the second region 13. As a result, the bending shape of the bending region tends to be oval, the bending radius of the first region 12 is excessively small, and there is a risk of squeezing the folded portion 23 of the flexible screen 2; and if B2/B1 is excessively large (for example, greater than 1.5), the bending rigidity difference between the first region 12 and the second region 13 is large. As a result, the deformation amount of the first region 12 during the bending process is excessively small, and there is also a risk of squeezing the folded portion 23 of the flexible screen 2. In this way, in a case that 1<B2/B1≤1.5, while the first region 12 has a large deformation amount, a bending radius after bending of the first region 12 can be increased, thereby reducing the squeezing of the folded portion 23 of the flexible screen 2 by the bending region of the protective component 1.

Figure 16:
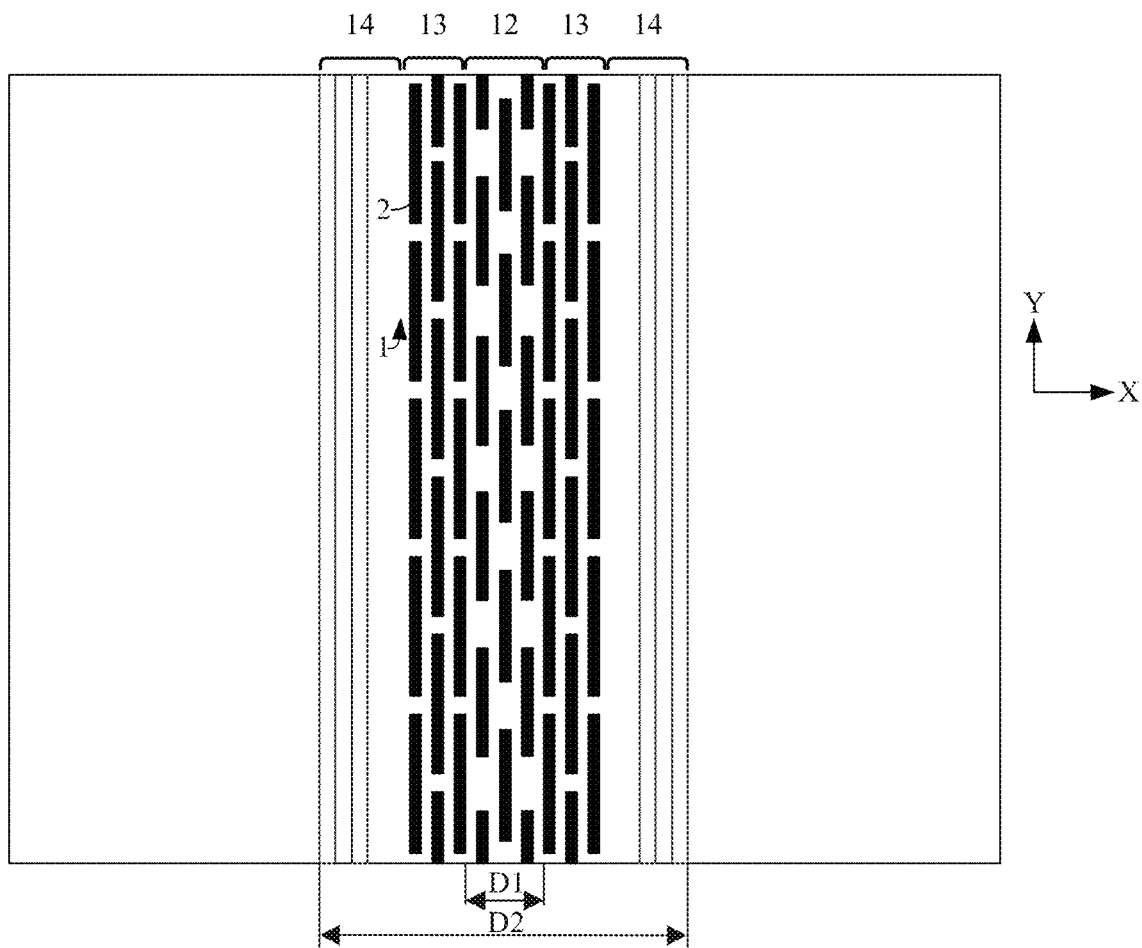
FIG. 16 is a schematic structural diagram of a display assembly in a fourth specific embodiment and a fifth specific embodiment according to this application, where the display assembly is in an expanded state.
Figure 17:
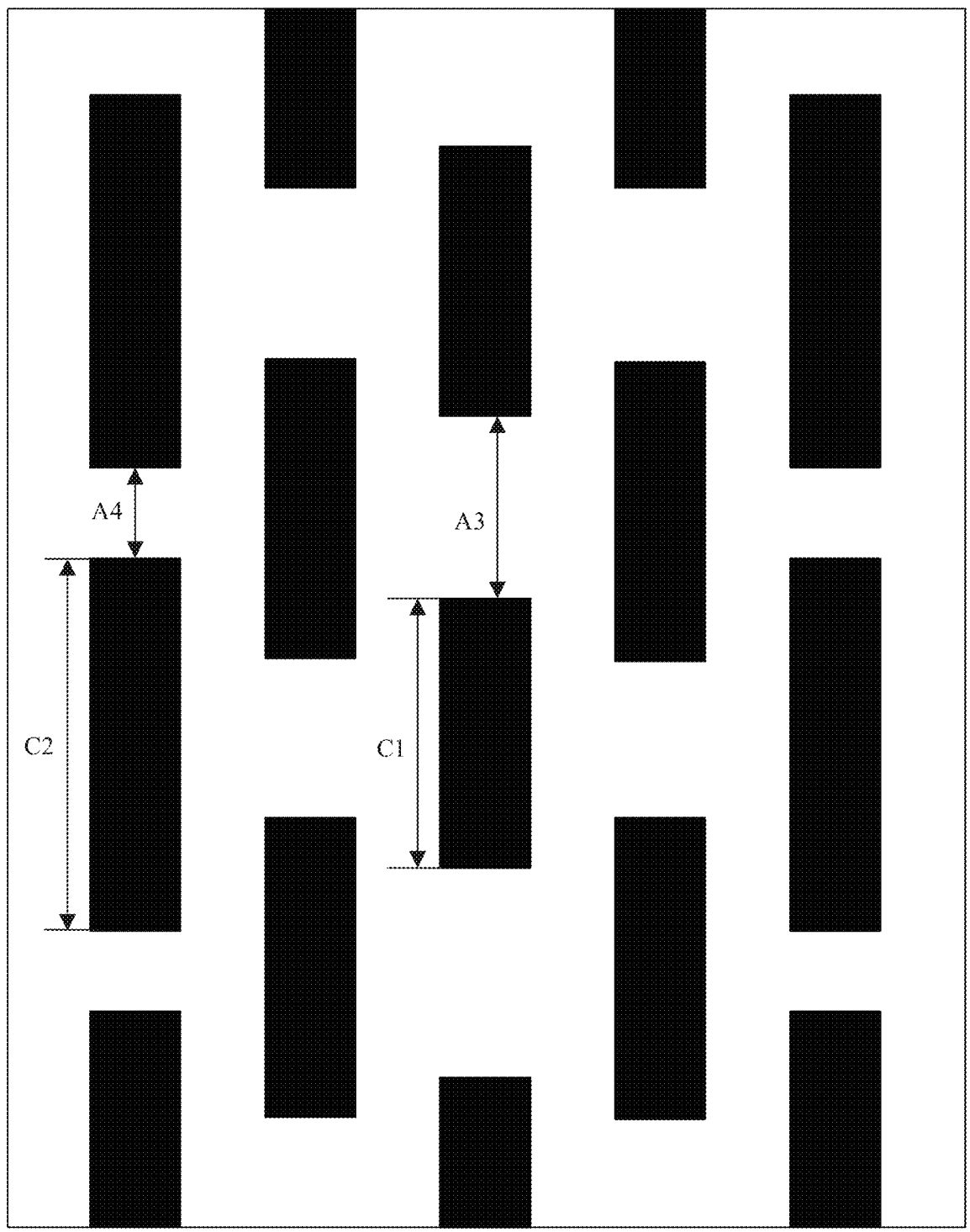
FIG. 17 is a schematic structural diagram of a bending region of the display assembly in FIG. 16.

In a fourth specific embodiment, as shown in FIG. 16 and FIG. 17, FIG. 16 is a schematic structural diagram of a display assembly in this embodiment, and FIG. 17 is a schematic structural diagram of a bending region of the display assembly in FIG. 16. The display assembly is in the expanded state. The size of the recessed portion 11 of the first region 12 in the third direction Y is C1, and the size of the recessed portion 11 of the second region 13 in the third direction Y is C2, where C1>C2. C1 and C2 are the maximum distances of the recessed portion 11 on the protective component 1 in the third direction the third direction Y.

In this embodiment, in the third direction Y, a larger length of the recessed portion 11 indicates fewer material in the region not provided with the recessed portions 11. Moreover, since the region where the recessed portion 11 is not arranged is mainly configured to withstand the stress during the bending process of the protective component 1, when the material where the recessed portion 11 is not arranged is few, the cross-sectional area of the region where the recessed portion 11 is not arranged is small, and the bending rigidity of the protective component 1 in the corresponding region is small. Since a length dimension C1 of the recessed portion 11 of the first region 12 in the third direction Y is less than the length dimension C2 of the recessed portion 11 of the second region 13, the bending rigidity of the first region 12 is greater than the bending rigidity of the second region 13.

Specifically, $1<C2/C1≤1.5$. For example, C2/C1 may specifically be 1.2, 1.3, 1.4, 1.5, and the like.

In the third direction Y, a value of the length dimension C2/C1 of the recessed portion 11 should not be excessively large or excessively small. When the value of C2/C1 is excessively small (for example, less than 1), the bending rigidity of the second region 13 is greater than the bending rigidity of the first region 12. As a result, the bending shape of the bending region may tend to be oval, the bending radius of the first region 12 is excessively small, and there is a risk of squeezing the folded portion 23 of the flexible screen 2; and when the value of C2/C1 is excessively large (for example, greater than 1.5), the bending rigidity difference between the second region 13 and the first region 12 is large. As a result, the deformation amount of the first region 12 during the bending process is excessively small, and there is also a risk of squeezing the folded portion 23 of the flexible screen 2. In this way, in a case that $1<C2/C1≤1.5$, while the first region 12 has a large deformation amount, a bending radius after bending of the first region 12 can be increased, thereby reducing the squeezing of the folded portion 23 of the flexible screen 2 by the bending region of the protective component 1.

In a fifth specific embodiment, as shown in FIG. 16 to FIG. 17, FIG. 16 is a schematic structural diagram of a display assembly in this embodiment, and FIG. 17 is a schematic structural diagram of a bending region of the display assembly in FIG. 16. A third distance A3 is defined in the third direction Y between adjacent recessed portions 11 of the first region 12, and a fourth distance A4 is defined between adjacent recessed portions 11 of the second region 13 in the third direction Y, where A3>A4. A3 and A4 are the minimum distances in the third direction Y between adjacent recessed portions 11 on the protective component 1.

In this embodiment, In the third direction Y, a larger distance between adjacent recessed portions 11 indicates larger material in the region not provided with the recessed portions 11. Moreover, since the region where the recessed portion 11 is not arranged is mainly configured to withstand the stress during the bending process of the protective component 1, when the material where the recessed portion 11 is not arranged is large, the cross-sectional area of the region where the recessed portion 11 is not arranged is large, and the bending rigidity of the protective component 1 in the corresponding region is large. Because the third distance A3 is greater than the fourth distance A4, the bending rigidity of the first region 12 is greater than the bending rigidity of the second region 13. In this embodiment, by changing the distance between the recessed portions 11 in the first region 12 and the second region 13 of the protective component 1 in the third direction Y, the bending rigidity of the first region 12 can be easily realized to be greater than the bending rigidity of the second region 13, and the structure of the protective component 1 can be simplified.

Specifically, $1<A3/A4≤1.5$. For example, A3/A4 may specifically be 1.2, 1.3, 1.4, 1.5, and the like.

The ratio of the third distance A3 and the fourth distance A4 should not be excessively large or excessively small. If A3/A4 is excessively small (for example, less than 1), the bending rigidity of the first region 12 is less than the bending rigidity of the second region 13. As a result, the bending shape of the bending region tends to be oval, the bending radius of the first region 12 is excessively small, and there is a risk of squeezing the folded portion 23 of the flexible screen 2; and if A3/A4 is excessively large (for example, greater than 1.5), the bending rigidity difference between the first region 12 and the second region 13 is large. As a result, the deformation amount of the first region 12 during the bending process is excessively small, and there is also a risk of squeezing the folded portion 23 of the flexible screen 2. In this way, in a case that $1<A3/A4≤1.5$, while the first region 12 has a large deformation amount, a bending radius after bending of the first region 12 can be increased, thereby reducing the squeezing of the folded portion 23 of the flexible screen 2 by the bending region of the protective component 1.

Figure 18:
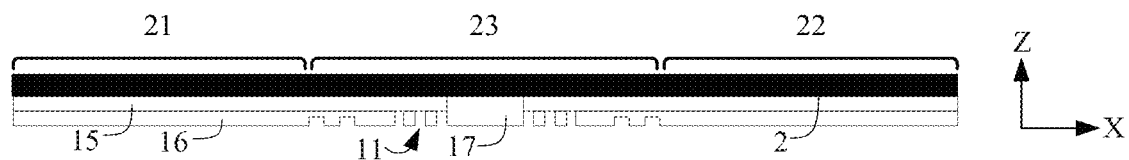
FIG. 18 is a schematic structural diagram of a display assembly in a sixth specific embodiment according to this application, where the display assembly is in an expanded state.

In a sixth specific embodiment, as shown in FIG. 18, FIG. 18 is a schematic structural diagram of the display assembly in this specific embodiment. The display assembly is in the expanded state. The second region 13 includes at least a first layer 15 and a second layer 16 stacked on each other in the first direction Z. The first region 12 includes a third layer 17. The thickness of the third layer 17 is the same as a sum of the thickness of the first layer 15 and the thickness of the second layer 16 in the first direction Z. The third layer 17 and the first layer 15 may be an integral structure or a split structure, and an elastic modulus of materials of the first layer 15 and the third layer 17 is greater than an elastic modulus of a material of the second layer 16.

In this embodiment, the first region 12 includes a third layer 17 having a large elastic modulus, and the second region 13 includes a first layer 15 having a large elastic modulus and a second layer 16 having a small elastic modulus. The thickness of the third layer 17 is the same as a sum of the thickness of the first layer 15 and the thickness of the second layer 16 in the first direction Z. that is to say, an overall elastic modulus of the first region 12 is greater than an overall elastic modulus of the second region 13. When the cross-sectional area is the same, a large elastic modulus leads to a large bending rigidity, and a small deformation amount during bending. Therefore, the bending rigidity of the first region 12 is greater than the bending rigidity of the second region 13, thereby reducing the risk that the radius of the screen accommodating space formed by the excessive deformation amount of the first region 12 during the folding process is excessively small.

In this embodiment, the first layer 15 and the second layer 16 can be adhered in the second region 13.

Figure 19:
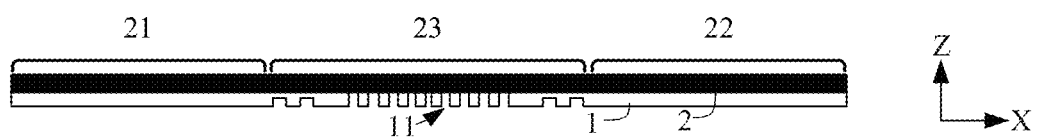
FIG. 19 is a schematic structural diagram of a display assembly in a seventh specific embodiment according to this application, where the display assembly is in an expanded state.
Figure 20:
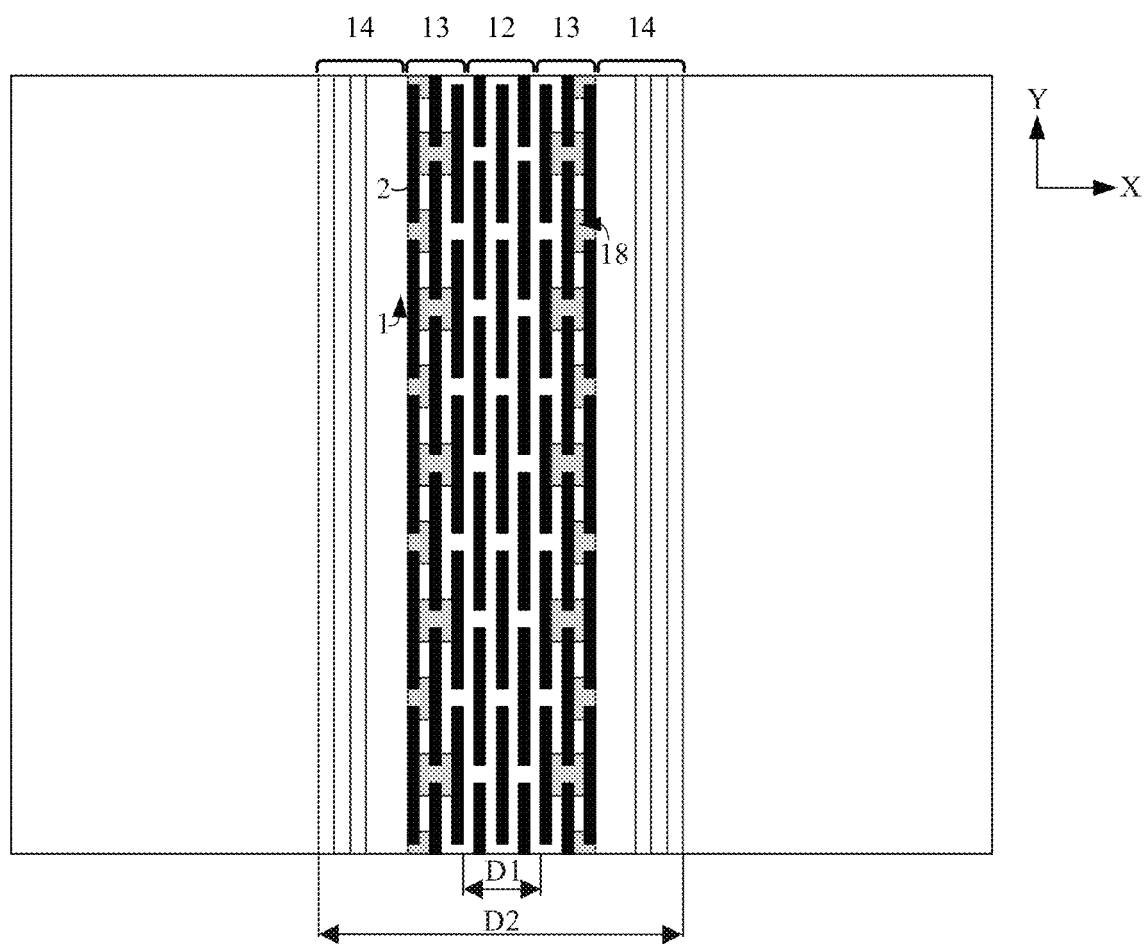
FIG. 20 is a bottom view of FIG. 19.

In a seventh specific embodiment, as shown in FIG. 19 and FIG. 20, FIG. 19 is a schematic structural diagram of a display assembly in a seventh specific embodiment, and FIG. 20 is a bottom view of FIG. 19. In the first direction Z, the thickness of at least a part of the second region 13 is less than the thickness of the first region 12. That is to say, the second region 13 has a thinned region 18. A thickness of the thinned region 18 is less than a thickness of the first region 12, and the second region 13 is all or part of the thinned region 18.

In this embodiment, since the thinned region 18 is arranged on the second region 13, the material used in the second region 13 to withstand the stress during the bending process of the protective component 1 is less than that of the first region 12, so that the bending rigidity of the second region 13 is smaller than the bending rigidity of the first region 12.

In the above embodiments, as shown in FIG. 6, FIG. 10, FIG. 14, and FIG. 16, a width of the first region 12 is D1, and a width of the bending region of the protective component 1 is D2, where $½ ≤ D1/D2 ≤ ⅔$. For example, D1/D2 may specifically be 0.5, 0.55, 0.6, and the like.

As described above, the first region 12 is a part having a large bending rigidity in the bending region. Therefore, D1/D2 can represent the ratio of the part having a large bending rigidity in the bending region in the entire bending region. A value of D1/D2 should not be excessively large or excessively small. When the value of D1/D2 is excessively large, the size of the first region 12 in the second direction X is excessively large, and the bending rigidity is that in the bending region, the ratio of the region having a large bending rigidity is excessively large, which causes an overall deformation amount of the bending region is excessively small during the folding process. As a result, the bending region cannot provide enough screen accommodating space for the folded portion 23 of the flexible screen 2, and increases bending difficulty of the display assembly; and when the value of D1/D2 is excessively small, the size of the first region 12 in the second direction X is excessively small. The bending rigidity is that in the bending region, the ratio of the first region 12 having a large bending rigidity is excessively small, so that the bending radius of the bending region cannot be effectively increased during the folding process of the first region 12, which causes the flexible screen 2 is squeezed.

Figure 21:
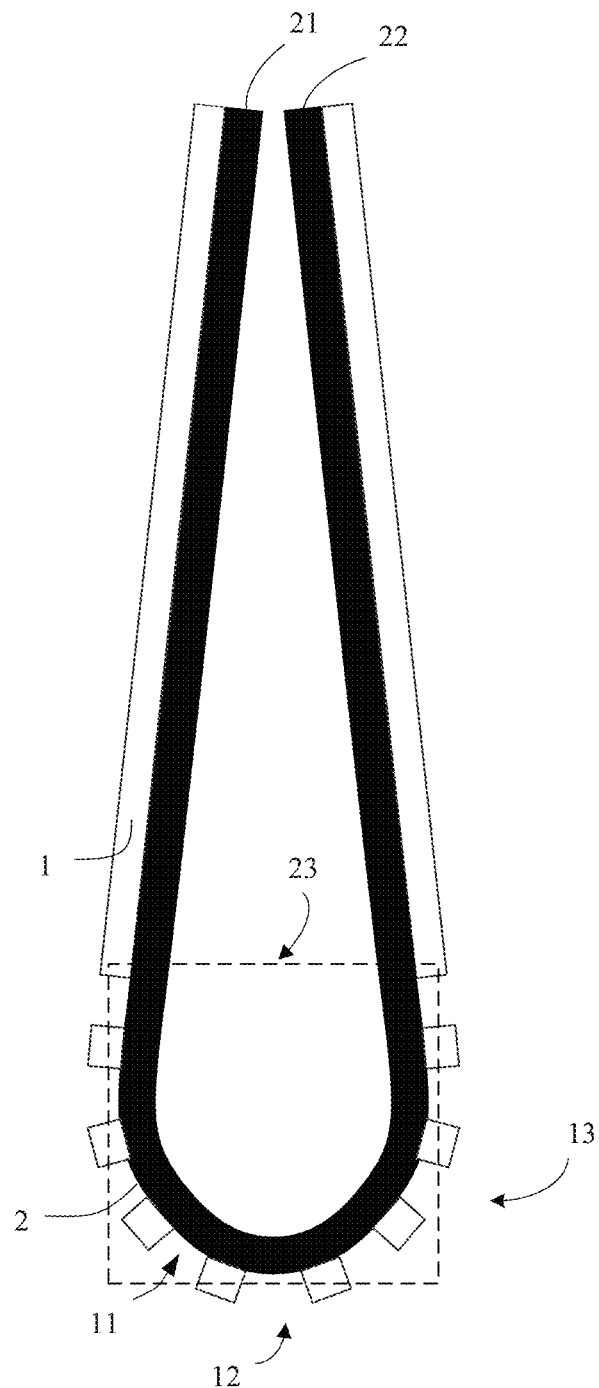
FIG. 21 is a schematic structural diagram of a display assembly in a bent state according to this application, where the display assembly is in a shape of a club.

In a specific embodiment, as shown in FIG. 21, after the display assembly is folded, the folded portion 23 of the flexible screen 2 is folded into a baseball bat shape. As can be seen from the figure, the folded portion 23 of the flexible screen 2 is folded only once, that is, the bending region of the protective component 1 is folded once. In this case, the first region 12 and the second region 13 of the bending region correspond to the folded portion 23 of the flexible screen 2.

Figure 12:
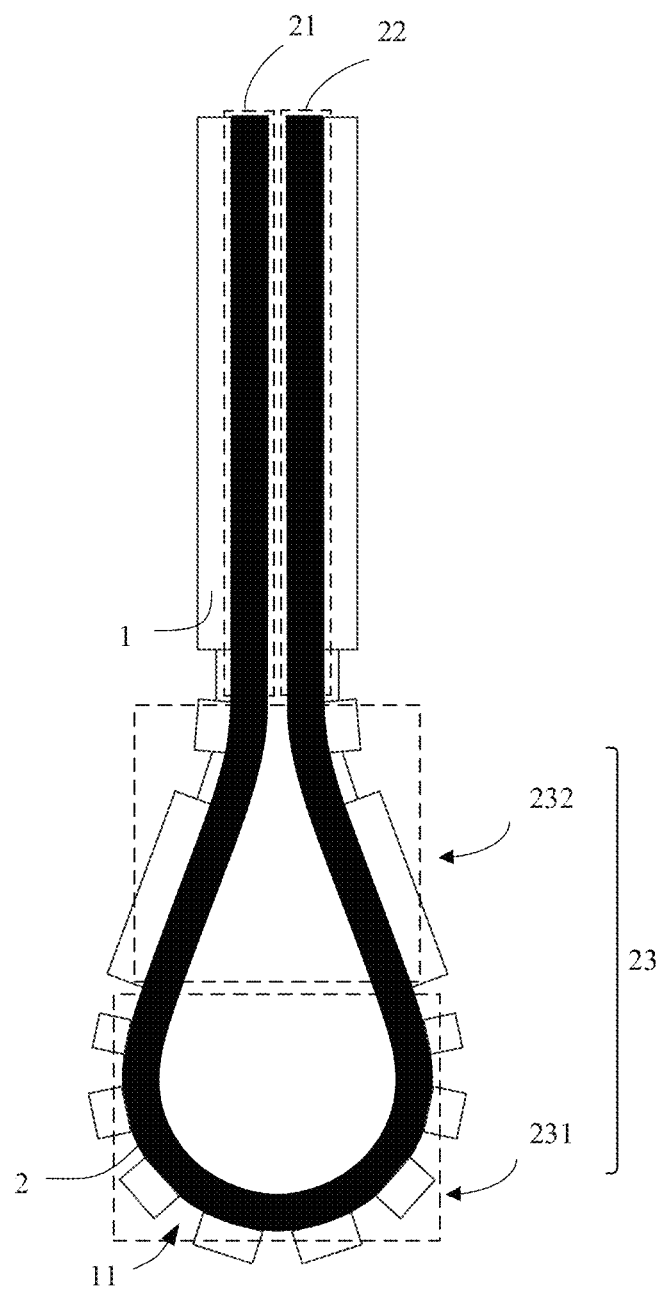
FIG. 12 is a schematic structural diagram of the display assembly in FIG. 9 in a bent state.

In another specific embodiment, as shown in FIG. 8 and FIG. 12, after the display assembly is folded, the folded portion 23 of the flexible screen 2 is folded into a water drop shape. As can be seen from the figure, the folded portion 23 of the flexible screen 2 is folded on both sides, that is, the bending region of the protective component 1 is folded twice. Therefore, the folded portion 23 includes a first folded portion 231 and a second folded portion 232. The first folded portion 231 is arc-shaped. Accordingly, the bending region of the protective component 1 includes not only the first region 12 and the second region 13, but also two outer regions 14. The two outer regions 14 are located on a side of the two second regions 13 away from the first region 12 in the second direction X, and when the display assembly is in the folded state, the two outer regions 14 correspond to the second folded portion 232 of the flexible screen 2.

Figure 22:
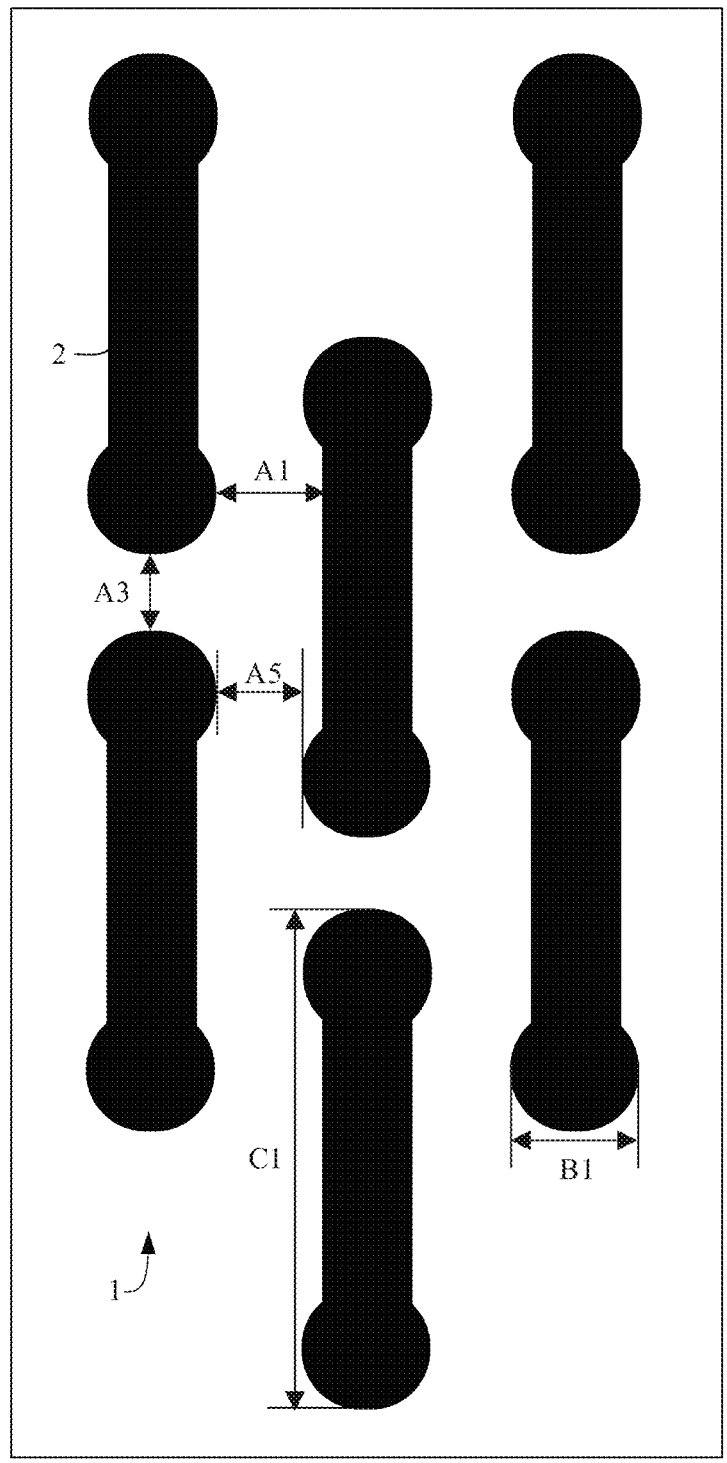
FIG. 22 is a partial enlarged view of a first region of a display assembly in an expanded state according to this application, where both ends of a recessed portion on a protective component are circular.
Figure 23:
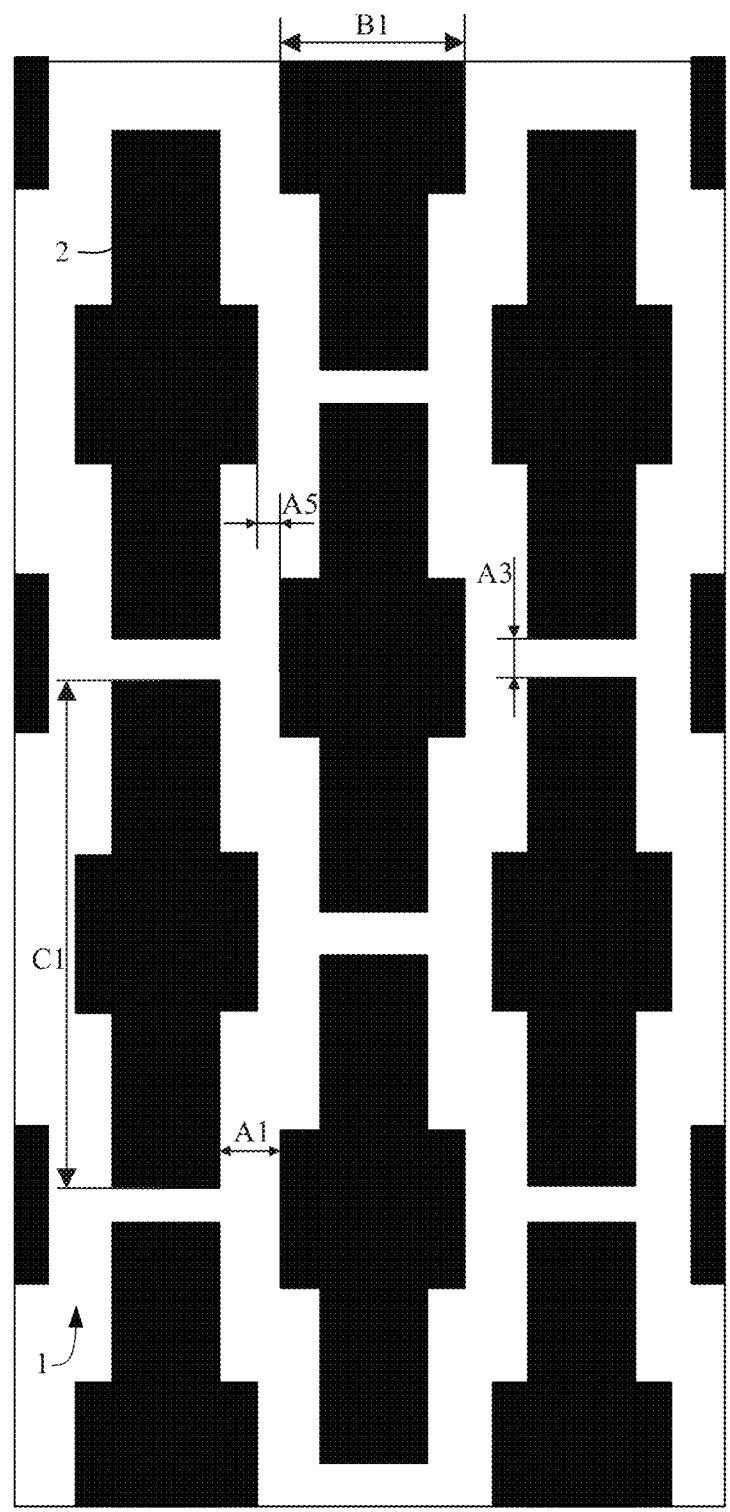
FIG. 23 is a partial enlarged view of a first region of a display assembly in an expanded state according to this application, where a recessed portion on a protective component is an irregular shape.

In the above embodiments, the recessed portion 11 may be a regular shape such as a rectangular structure, or may be another shape. For example, as shown in FIG. 22 and FIG. 23, FIG. 22 and FIG. 23 are partial enlarged views of a first region 12 of a display assembly in an expanded state according to this application. Both ends of the recessed portion 11 of the protective component 1 may also include a circular arc segment or a shape having uneven dimensions in the second direction X, thereby reducing stress concentration of the recessed portion 11 and improving the structural strength of the protective component 1 and the display assembly. In this case, in the second direction X, the first distance A1 in the figure is the minimum distance between adjacent recessed portions 11 in the same cross-section, and the fifth distance A5 is the minimum distance between adjacent recessed portions 11 in the second direction X.

Meanwhile, the shape of the recessed portion 11 of the second region 13 may be consistent with or may be inconsistent with the shape of the recessed portion 11 of the first region 12, and the bending rigidity of the first region 12 may be greater than the bending rigidity of the second region 13.

A part of this application file contains the content protected by copyright. Except for making copies of the patent files of the Patent Office or the contents of the recorded patent files, the copyright owner reserves the right to copyright.

What is claimed is:

1. A display assembly, applicable to a foldable electronic device, wherein the display assembly comprises:
   a flexible screen; and
   a protective component, connected to the flexible screen in a first direction of the protective component, wherein
   a bending region of the protective component comprises a first region and second regions, and the second regions are located on two sides of the first region in a second direction of the protective component, and wherein at least one second region of the second regions comprises at least a first layer and a second layer stacked on each other in the first direction of the protective component, the first region comprises a third layer, and a thickness of the third layer is the same as a sum of thicknesses of the first layer and the second layer, and an elastic modulus of materials of the first layer and the third layer is greater than an elastic modulus of a material of the second layer; and
   when the display assembly is bent, the first region has a smaller average deformation amount than each second region.

2. The display assembly according to claim 1, wherein a plurality of recessed portions recessed in the first direction of the protective component are arranged in the bending region, and the plurality of recessed portions are spaced apart from each other in the second direction of the protective component and a third direction of the protective component.

3. The display assembly according to claim 2, wherein a depth t1 of each of the recessed portions of the first region is less than a depth t2 of the recessed portion of the at least one second region.

4. The display assembly according to claim 2, wherein the recessed portion located in the first region is a groove, and the recessed portion located in the at least one second region is a through hole extending through the protective component in the first direction of the protective component.

5. The display assembly according to claim 2, wherein a first distance A1 is defined between adjacent recessed portions of the first region in the second direction of the protective component, a second distance A2 is defined between adjacent recessed portions of the at least one second region in the second direction of the protective component, and A1>A2.

6. The display assembly according to claim 5, wherein 1<A1/A2≤1.5.

7. The display assembly according to claim 2, wherein a size of the recessed portion of the first region in the second direction of the protective component is B1, a size of the recessed portion of the at least one second region in the second direction of the protective component is B2, and B1<B2.

8. The display assembly according to claim 7, wherein 1<B2/B1≤1.5.

9. The display assembly according to claim 2, wherein a size of the recessed portion of the first region in the third direction of the protective component is C1, a size of the recessed portion of the at least one second region in the third direction of the protective component is C2, and C1<C2.

10. The display assembly according to claim 9, wherein 1<C2/C1≤1.5.

11. The display assembly according to claim 2, wherein a third distance A3 is defined between adjacent recessed portions of the first region in the third direction of the protective component, a fourth distance A4 is defined between adjacent recessed portions of the at least one second region in the third direction of the protective component, and A3>A4.

12. The display assembly according to claim 11, wherein 1<A3/A4≤1.5.

13. The display assembly according to claim 1, wherein in the first direction of the protective component, a thickness of at least part of the at least one second region is less than a thickness of the first region.

14. The display assembly according to claim 1, wherein a width of the first region is D1, a width of the bending region of the protective component is D2, and ½≤D1/D2≤⅔.

15. A foldable electronic device, wherein the foldable electronic device comprises a housing and
a display assembly, the display assembly is mounted to the housing;
the display assembly comprises a flexible screen and a protective component;
the protective component is connected to the flexible screen in a first direction of the protective component;
a bending region of the protective component comprises a first region and second regions, and the second regions are located on two sides of the first region in a second direction of the protective component, and wherein at least one second region of the second regions comprises at least a first layer and a second layer stacked on each other in the first direction of the protective component, the first region comprises a third layer, and a thickness of the third layer is the same as a sum of thicknesses of the first layer and the second layer, and an elastic modulus of materials of the first layer and the third layer is greater than an elastic modulus of a material of the second layer;
when the display assembly is bent, the first region has a smaller average deformation amount than each second region.

16. The foldable electronic device according to claim 15, wherein a plurality of recessed portions recessed in the first direction of the protective component are arranged in the bending region, and the plurality of recessed portions are spaced apart from each other in the second direction of the protective component and a third direction of the protective component.

17. The foldable electronic device according to claim 16, wherein a depth t1 of each of the recessed portions of the first region is less than a depth t2 of the recessed portion of the at least one second region.

18. The foldable electronic device according to claim 16, wherein the recessed portion located in the first region is a groove, and the recessed portion located in the at least one second region is a through hole extending through the protective component in the first direction of the protective component.

19. The foldable electronic device according to claim 16, wherein a first distance A1 is defined between adjacent recessed portions of the first region in the second direction of the protective component, a second distance A2 is defined between adjacent recessed portions of the at least one second region in the second direction of the protective component, and A1>A2.

20. The foldable electronic device according to claim 19, wherein 1<A1/A2≤1.5.

* * * * *